(12) United States Patent
Yanagisawa et al.

(10) Patent No.: US 11,904,524 B2
(45) Date of Patent: Feb. 20, 2024

(54) THREE-DIMENSIONAL MODELING DEVICE AND METHOD FOR MANUFACTURING THREE-DIMENSIONAL MODELED OBJECT

(71) Applicant: SEIKO EPSON CORPORATION, Tokyo (JP)

(72) Inventors: Hirokazu Yanagisawa, Sakata (JP); Kenichi Ono, Sakata (JP); Naoki Shishido, Higashitagawa-Gun Shonai-Machi (JP)

(73) Assignee: Seiko Epson Corporation, Tokyo (JP)

( * ) Notice: Subject to any disclaimer, the term of this patent is extended or adjusted under 35 U.S.C. 154(b) by 0 days.

(21) Appl. No.: 17/659,959

(22) Filed: Apr. 20, 2022

(65) Prior Publication Data

US 2022/0339856 A1  Oct. 27, 2022

(30) Foreign Application Priority Data

Apr. 23, 2021  (JP) ................. 2021-073144

(51) Int. Cl.
*B29C 64/106* (2017.01)
*B29C 64/209* (2017.01)
(Continued)

(52) U.S. Cl.
CPC .......... *B29C 64/106* (2017.08); *B29C 64/209* (2017.08); *B29C 64/232* (2017.08);
(Continued)

(58) Field of Classification Search
CPC ......... B29C 64/118; B29C 64/386–393; B29C 64/209; B33Y 50/00–02; G01B 5/063
See application file for complete search history.

(56) References Cited

U.S. PATENT DOCUMENTS

| | | | |
|---|---|---|---|
| 2,426,933 A | * | 9/1947 | Jarosz ............... G01B 5/063 33/838 |
| 2013/0089642 A1 | * | 4/2013 | Lipson ............... B33Y 10/00 426/115 |

(Continued)

FOREIGN PATENT DOCUMENTS

| | | |
|---|---|---|
| JP | 2017-217792 A | 12/2017 |
| JP | 2021-000811 A | 1/2021 |
| JP | 2021-000812 A | 1/2021 |

*Primary Examiner* — Matthew J Daniels
*Assistant Examiner* — Andrew L Swanson
(74) *Attorney, Agent, or Firm* — WORKMAN NYDEGGER

(57) ABSTRACT

A three-dimensional modeling device includes a modeling unit having a nozzle configured to eject a modeling material, a stage, a movement mechanism unit for changing a relative position between the nozzle and the stage, a measuring unit, a reference unit having a reference surface arranged at a position that corresponds to a deposition surface of the stage in an intersecting direction and where the reference surface can face the measuring unit, the reference unit being separate from the nozzle, and a control unit controlling the modeling unit and the movement mechanism unit. The control unit controls the measuring unit to measure a first distance between the measuring unit and the reference surface and a second distance between the measuring unit and the distal end surface, and decides a distance between a distal end surface of the nozzle and the deposition surface, based on the first and second distances.

12 Claims, 13 Drawing Sheets

(51) Int. Cl.
*B29C 64/295* (2017.01)
*B29C 64/35* (2017.01)
*B33Y 50/02* (2015.01)
*B29C 64/393* (2017.01)
*B33Y 10/00* (2015.01)
*B33Y 30/00* (2015.01)
*B29C 64/232* (2017.01)

(52) U.S. Cl.
CPC ............ *B29C 64/295* (2017.08); *B29C 64/35* (2017.08); *B29C 64/393* (2017.08); *B33Y 10/00* (2014.12); *B33Y 30/00* (2014.12); *B33Y 50/02* (2014.12)

(56) References Cited

U.S. PATENT DOCUMENTS

| | | | |
|---|---|---|---|
| 2017/0057171 A1* | 3/2017 | Chang | B29C 64/236 |
| 2018/0178448 A1* | 6/2018 | Kakuta | B29C 64/10 |
| 2018/0186094 A1* | 7/2018 | Yang | B33Y 99/00 |
| 2019/0001576 A1* | 1/2019 | Eller | B29C 64/209 |
| 2020/0406547 A1 | 12/2020 | Yuwaki et al. | |
| 2020/0406548 A1 | 12/2020 | Yuwaki et al. | |

\* cited by examiner

FIG. 5
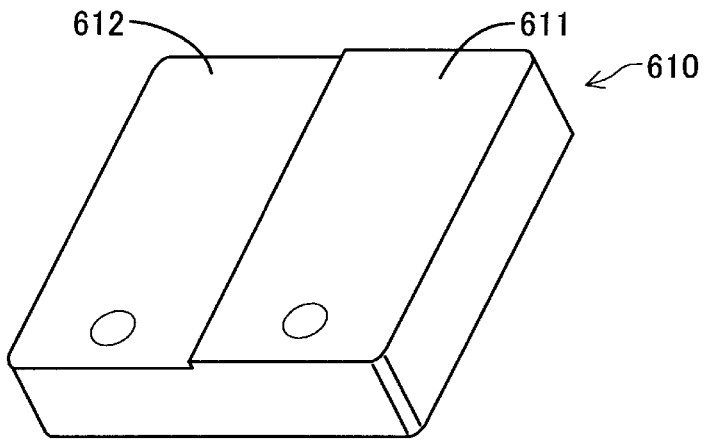
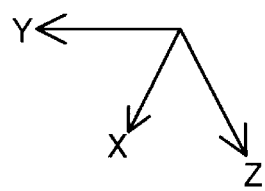
FIG. 6
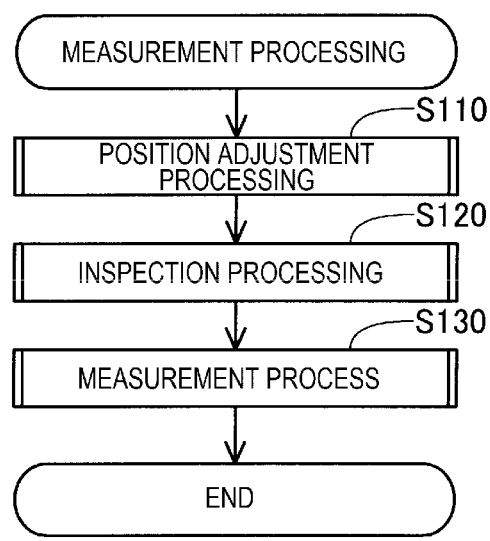

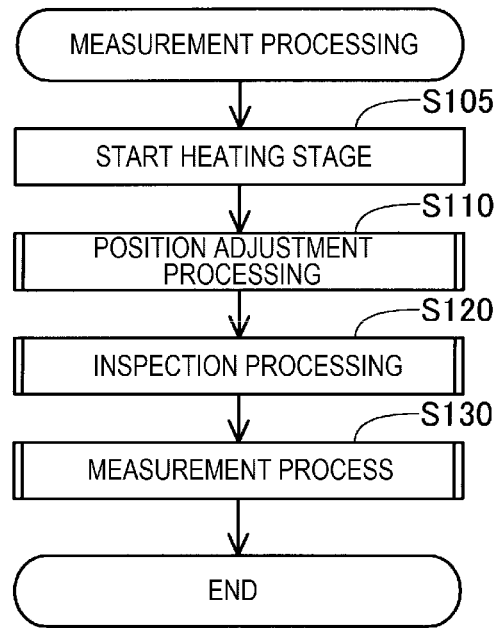
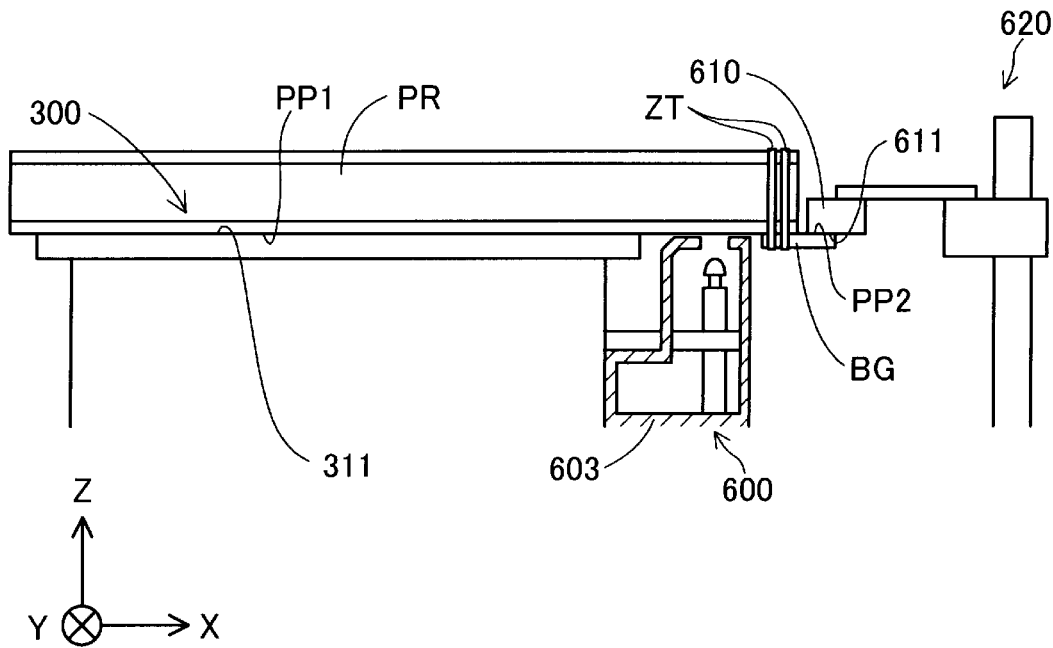

THREE-DIMENSIONAL MODELING DEVICE AND METHOD FOR MANUFACTURING THREE-DIMENSIONAL MODELED OBJECT

The present application is based on, and claims priority from JP Application Serial Number 2021-073144, filed Apr. 23, 2021, the disclosure of which is hereby incorporated by reference herein in its entirety.

BACKGROUND

1. Technical Field

The present disclosure relates to a three-dimensional modeling device and a method for manufacturing a three-dimensional modeled object.

2. Related Art

JP-A-2017-217792 discloses a technique for detecting an available modeling distance between a surface of a stage and a distal end surface of a nozzle in a three-dimensional modeling device, based on a first distance between a first detection unit supported in a unified manner with the stage and the distal end surface of the nozzle, detected by the first detection unit, and a second distance between the surface of the stage and the first detection unit, and controlling the position of the stage in relation to the nozzle, based on the available modeling distance, so as to model a modeled object. JP-A-2017-217792 discloses that the second distance is acquired, based on a measured value by a second detection unit supported in a unified manner with a modeling unit or based on a distance that is stored in advance or a distance acquired by correcting the distance that is stored in advance according to temperature or the like.

In the case where the second distance is acquired based on a measured value by the second detection unit supported in a unified manner with the modeling unit, when the modeling unit is replaced, the second detection unit needs to be replaced along with the modeling unit or needs to be attached to a new modeling unit. Meanwhile, in the case where the second distance is acquired based on a distance that is stored in advance or the like, the available modeling distance may differ from the actual distance and therefore the position of the stage in relation to the nozzle may not be able to be controlled based on the actual distance, possibly affecting the accuracy of the modeled object.

SUMMARY

According to a first aspect of the present disclosure, a three-dimensional modeling device is provided. The three-dimensional modeling device includes: a modeling unit having a nozzle ejecting a modeling material from a nozzle opening formed at a distal end surface; a stage having a deposition surface where the modeling material is deposited; a movement mechanism unit changing a relative position between the nozzle and the stage; a measuring unit arranged at a position where the measuring unit can face the distal end surface; a reference unit having a reference surface arranged at a position that corresponds to the deposition surface in an intersecting direction intersecting the deposition surface and where the reference surface can face the measuring unit, the reference unit being separate from the nozzle; and a control unit controlling the modeling unit and the movement mechanism unit to model a three-dimensional modeled object. The control unit controls the measuring unit to measure a first value that is a value about a distance between the measuring unit and the reference surface and a second value that is a value about a distance between the measuring unit and the distal end surface, and decides a distance between the distal end surface and the deposition surface for when modeling the three-dimensional modeled object, based on the first value and the second value.

According to a second aspect of the present disclosure, a method for manufacturing a three-dimensional modeled object in a three-dimensional modeling device is provided. The three-dimensional modeling device includes: a nozzle ejecting a modeling material from a nozzle opening formed at a distal end surface; a stage having a deposition surface where the modeling material is deposited; a movement mechanism unit changing a relative position between the nozzle and the stage; a measuring unit arranged at a position where the measuring unit can face the distal end surface; and a reference unit having a reference surface arranged at a position that corresponds to the deposition surface in an intersecting direction intersecting the deposition surface and where the reference surface can face the measuring unit, the reference unit being separate from the nozzle. The method for manufacturing the three-dimensional modeled object includes: a first process of causing the measuring unit to measure a first value that is a value about a distance between the measuring unit and the reference surface; a second process of causing the measuring unit to measure a second value that is a value about a distance between the measuring unit and the distal end surface; and a third process of changing a relative position between the nozzle ejecting the modeling material and the stage and thus modeling the three-dimensional modeled object. A distance between the distal end surface and the deposition surface in the third process is decided, based on the first value and the second value.

BRIEF DESCRIPTION OF THE DRAWINGS

FIG. 5 is a perspective view showing the configuration of a bottom side of a reference unit.

FIG. 6 is a flowchart showing measurement processing in the first embodiment.

FIG. 14 is a flowchart showing measurement processing in a second embodiment.

FIG. 15 explains an example of position adjustment processing in another embodiment.

DESCRIPTION OF EXEMPLARY EMBODIMENTS

A. First Embodiment

Figure 1:
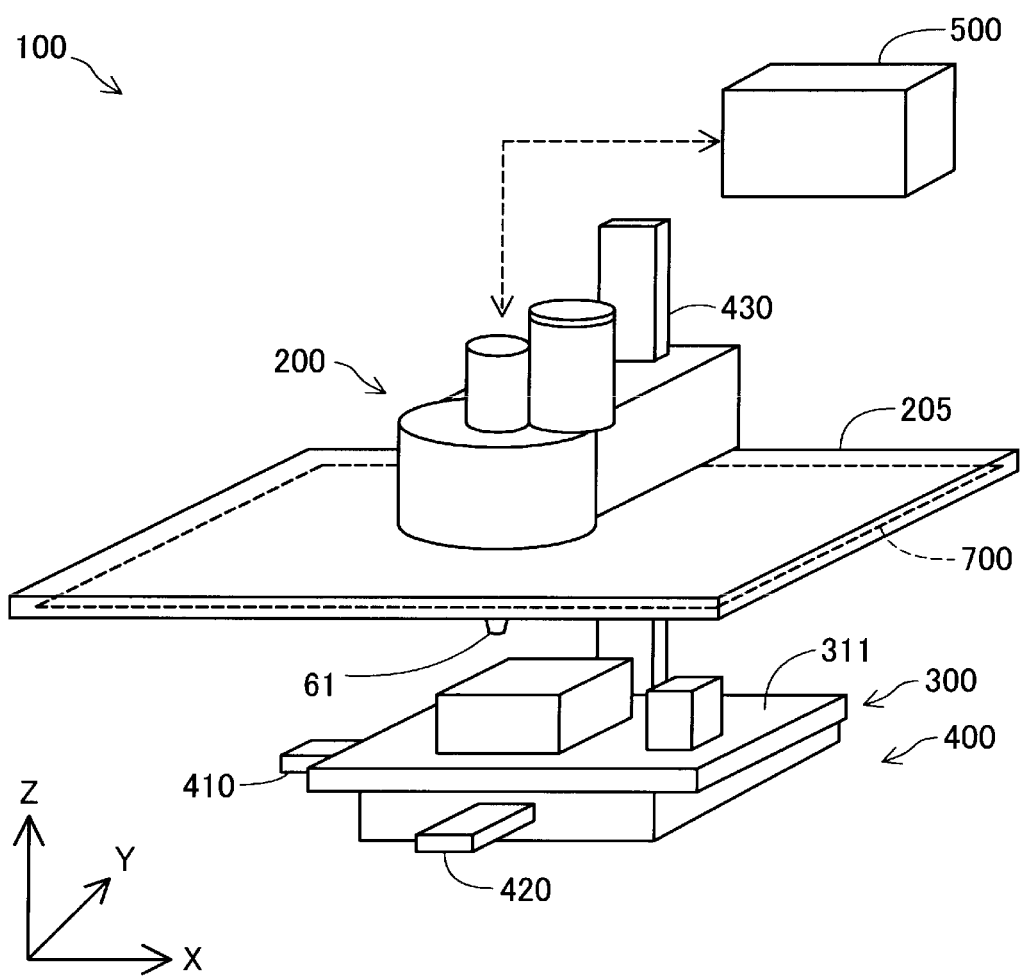
FIG. 1 is a first view showing a schematic configuration of a three-dimensional modeling device according to a first embodiment.
Figure 2:
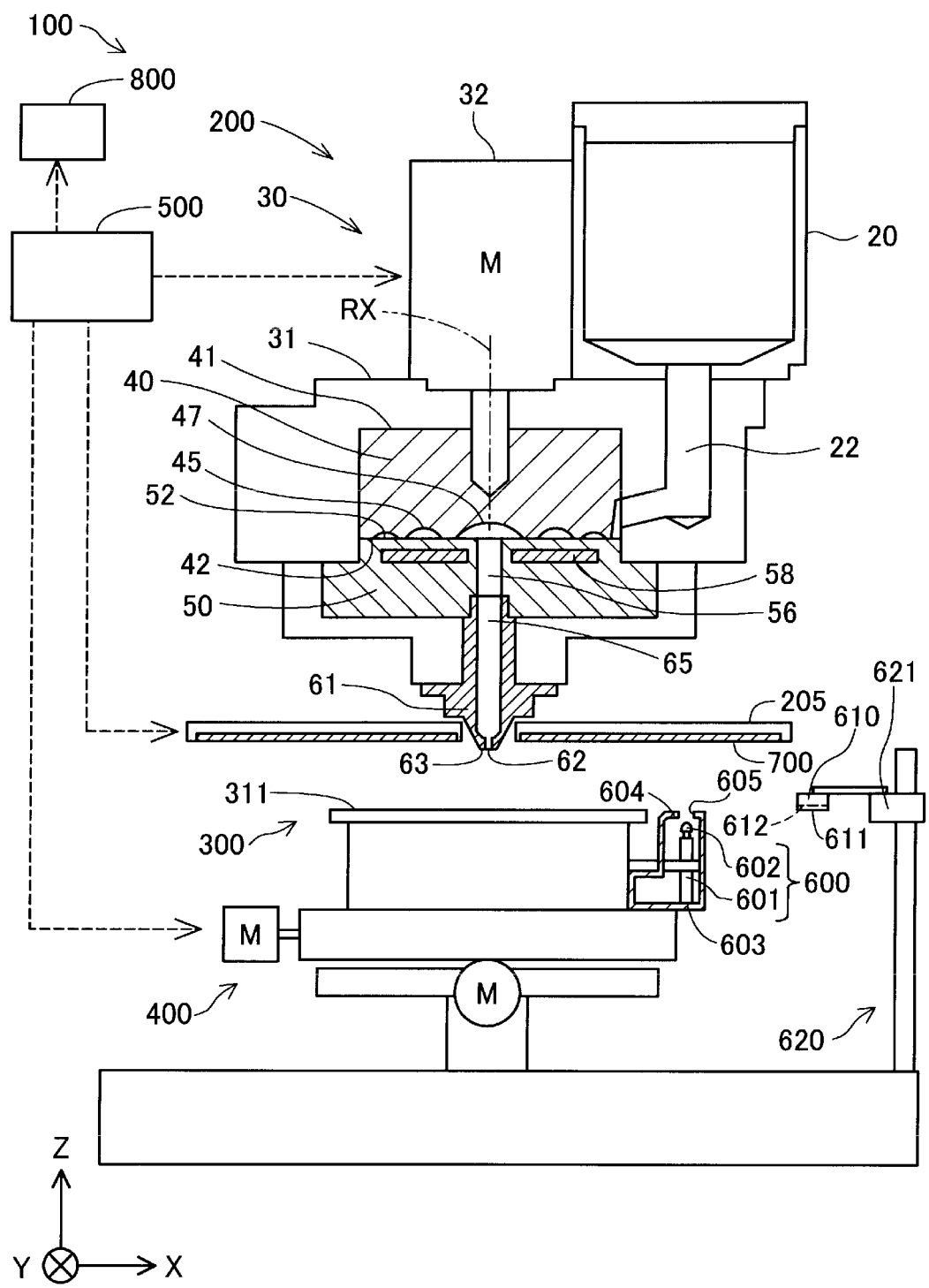
FIG. 2 is a second view showing a schematic configuration of the three-dimensional modeling device according to the first embodiment.

FIG. 1 is a first view showing a schematic configuration of a three-dimensional modeling device 100 according to a first embodiment. FIG. 2 is a second view showing a schematic configuration of the three-dimensional modeling device 100 according to the first embodiment. In FIGS. 1 and 2, arrows along X-, Y-, and Z-directions orthogonal to each other are illustrated. The X-, Y-, and Z-directions are direction along an X-axis, a Y-axis, and a Z-axis, which are three spatial axes orthogonal to each other. The X-, Y-, and Z-directions include both one direction and the opposite direction along the X-axis, the Y-axis, and the Z-axis. The X-axis and the Y-axis are axes along a horizontal plane. The Z-axis is an axis along a vertical line. A −Z-direction is a vertical direction. A +Z-direction is the opposite direction of the vertical direction. The −Z-direction is also referred to as "down". The +Z-direction is also referred to as "up". In other illustrations, arrows along the X-, Y-, and Z-directions are similarly shown according to need. The X-, Y-, and Z-directions in FIGS. 1 and 2 and the X-, Y-, and Z-directions in the other illustrations represent the same directions.

As shown in FIGS. 1 and 2, the three-dimensional modeling device 100 has a modeling unit 200, a stage 300, a movement mechanism unit 400, a control unit 500, a measuring unit 600, a reference unit 610, an adjustment unit 620, a heating unit 700, and a reporting unit 800. In FIG. 1, the measuring unit 600, the reference unit 610, the adjustment unit 620, and the reporting unit 800 are not illustrated.

The modeling unit 200 under the control of the control unit 500 ejects a modeling material formed by melting a solid-state material into a paste, onto the stage 300 for modeling, which is a base for a three-dimensional modeled object. As shown in FIG. 2, the modeling unit 200 has a material supply unit 20, which is the supply source of the material before being converted into the modeling material, a plasticizing unit 30 plasticizing the material to generate the modeling material, and a nozzle 61 ejecting the generated modeling material. The modeling unit 200 may also be referred to as a head.

The material supply unit 20 accommodates the material in the form of pellets, powder or the like. In this embodiment, an ABS resin in the form of pellets is used as the material. The material supply unit 20 in this embodiment is formed by a hopper. Below the material supply unit 20, a supply path 22 coupling the material supply unit 20 and the plasticizing unit 30 together is provided. The material supply unit 20 supplies the material to the plasticizing unit 30 via the supply path 22. Details of the material will be described later.

The plasticizing unit 30 has a screw case 31, a drive motor 32, a screw 40, and a barrel 50. The plasticizing unit 30 plasticizes at least a part of the material supplied from the material supply unit 20, thus generates a paste-like modeling material with fluidity, and supplies the modeling material to the nozzle 61. To "plasticize" means heating and thus melting a thermoplastic material. To "melt" not only means heating a thermoplastic material to a temperature equal to or higher than the melting point and thus turning the material into a liquid state but also means heating a thermoplastic material to a temperature equal to or higher than the glass transition point and thus softening the material to have fluidity. The screw 40 in this embodiment is a so-called flat screw and may also be referred to as a "scroll".

The screw case 31 is a casing for accommodating the screw 40. The barrel 50 is fixed to a bottom surface of the screw case 31. The screw 40 is accommodated in a space surrounded by the screw case 31 and the barrel 50. The screw 40 has a groove-formed surface 42 where a groove 45 is formed, at a surface facing the barrel 50. The drive motor 32 is fixed to a top surface of the screw case 31. The rotary shaft of the drive motor 32 is coupled to a top surface 41 side of the screw 40. The drive motor 32 may not be directly coupled to the screw 40. For example, the screw 40 and the drive motor 32 may be coupled together via a speed reducer. The drive motor 32 is driven under the control of the control unit 500.

The barrel 50 is arranged below the screw 40. The barrel 50 has a screw-facing surface 52 facing the groove-formed surface 42 of the screw 40. In the barrel 50, a communication hole 56 communicating to a nozzle flow path 65 of the nozzle 61, described later, is provided on a center axis RX of the screw 40. In the barrel 50, a heater 58 is installed at a position facing the groove 45 of the screw 40. The temperature of the heater 58 is controlled by the control unit 500.

Figure 3:
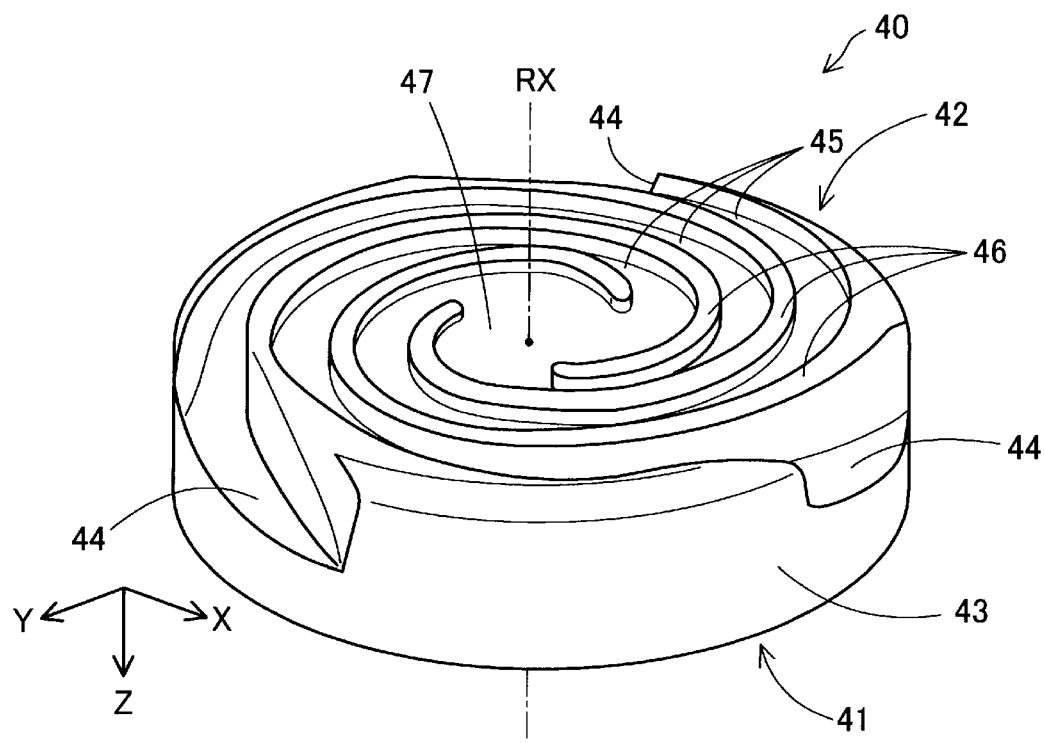
FIG. 3 is a schematic perspective view showing the configuration of a groove-formed surface side of a screw.

FIG. 3 is a schematic perspective view showing the configuration of the groove-formed surface 42 side of the screw 40. A center part 47 of the groove-formed surface 42 of the screw 40 is formed as a recess to which one end of the groove 45 is coupled. The center part 47 faces the communication hole 56 of the barrel 50 shown in FIG. 2. The center part 47 intersects the center axis RX.

The groove 45 forms a so-called scroll groove. The groove 45 extends in an eddy-like shape in such a way as to form an arc from the center part 47 toward the outer circumference of the screw 40. At the groove-formed surface 42, a protruding part 46 forming a sidewall part of the groove 45 and extending along each groove 45 is provided. The groove 45 continues to a material inlet port 44 formed at a side surface 43 of the screw 40. The material inlet port 44 is a part accepting the material supplied via the supply path 22 of the material supply unit 20. In this embodiment, as shown in FIG. 2, three grooves 45 are formed, spaced apart from each other by the protruding part 46. However, the number of grooves 45 is not limited to three and may be one, or two or more. The groove 45 is not limited to an eddy-like shape and may be in a spiral shape or an involute curve or may be in a shape extending in such a way as to form an arc from the center part toward the outer circumference.

Figure 4:
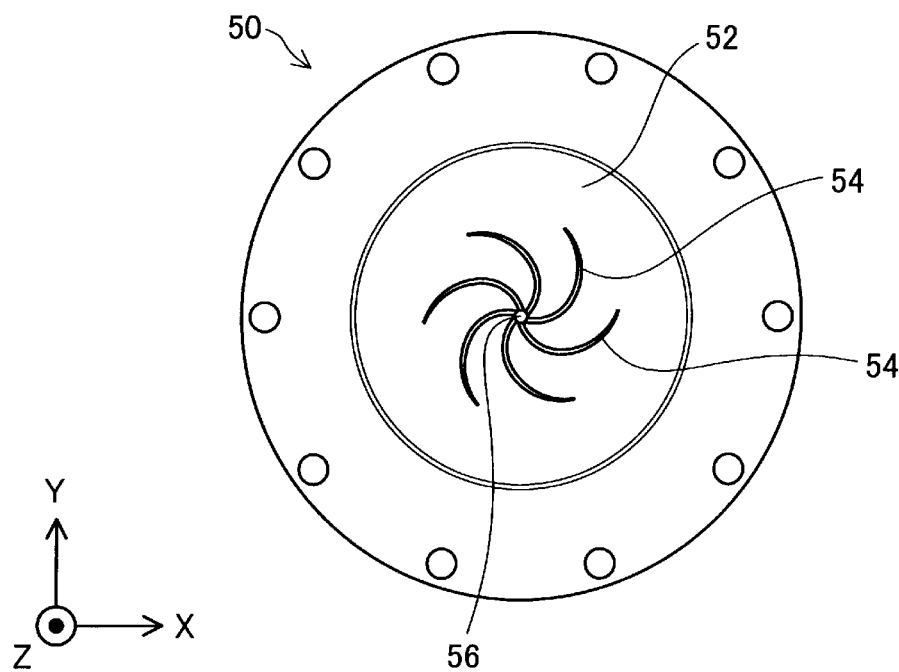
FIG. 4 is a top view showing the configuration of a screw-facing surface side of a barrel.

FIG. 4 is a top view showing the configuration of the screw-facing surface 52 side of the barrel 50. As described above, the communication hole 56 is formed at the center of the screw-facing surface 52. A plurality of guide grooves 54 are formed around the communication hole 56 in the screw-facing surface 52. Each guide groove 54 is coupled to the communication hole 56 at one end and extends in an eddy-like shape from the communication hole 56 toward the outer circumference of the screw-facing surface 52. Each guide groove 54 has a function of guiding the modeling material to the communication hole 56. The one end of the guide groove 54 may not be coupled to the communication hole 56. The guide groove 54 may not be formed in the barrel 50.

As shown in FIG. 2, the nozzle 61 has the nozzle flow path 65, and a distal end surface 63 where a nozzle opening 62 is provided. The nozzle flow path 65 is a flow path for the modeling material formed in the nozzle 61 and is coupled to the communication hole 56 of the barrel 50. The distal end surface 63 is a surface forming a distal end part protruding in the −Z-direction toward a deposition surface 311, of the nozzle 61. The nozzle opening 62 is a part provided at an end part on the side communicating to the atmosphere of the nozzle flow path 65 and formed by reducing the cross section of the nozzle flow path 65. The modeling material generated by the plasticizing unit 30 is supplied to the nozzle 61 via the communication hole 56 and ejected from the nozzle opening 62 via the nozzle flow path 65.

The stage 300 is arranged at a position facing the distal end surface 63 of the nozzle 61. The stage 300 has the deposition surface 311, where the modeling material ejected from the nozzle opening 62 of the nozzle 61 is deposited. The deposition surface 311 in this embodiment is formed as a surface parallel to the X-direction and the Y-direction. In the description below, a direction intersecting the deposition surface 311 may be referred to as an intersecting direction. The intersecting direction includes both one direction and the opposite direction along the same axis. In this embodiment, the intersecting direction is a direction orthogonal to the deposition surface 311 and along the Z-axis. The three-dimensional modeling device 100 ejects the modeling material from the nozzle 61 toward the deposition surface 311 of the stage 300, stacks the modeling material in layers, and thus models a three-dimensional modeled object.

The movement mechanism unit 400 changes the relative position between the nozzle 61 and the stage 300. In this embodiment, the movement mechanism unit 400 moves the stage 300 in the X-direction and the Y-direction and thus changes the relative position between the nozzle 61 and the stage 300 in the X-direction and the Y-direction, and moves the modeling unit 200 along the Z-direction and thus changes the relative position between the nozzle 61 and the stage 300 in the Z-direction. In this embodiment, as shown in FIG. 1, the movement mechanism unit 400 includes a first electric actuator 410 moving the stage 300 along the X-direction, a second electric actuator 420 moving the stage 300 and the first electric actuator 410 along the Y-direction, and a third electric actuator 430 moving the modeling unit 200 along the Z-direction. The electric actuators 410 to 430 are driven under the control of the control unit 500. In another embodiment, the movement mechanism unit 400 may, for example, move the stage 300 in the Z-direction and move the modeling unit 200 along the X-direction and the Y-direction. Alternatively, the movement mechanism unit 400 may move the stage 300 in the X-direction, the Y-direction, and the Z-direction without moving the modeling unit 200, or may move the modeling unit 200 in the X-direction, the Y-direction, and the Z-direction without moving the stage 300.

In the description below, a change in the relative position of the nozzle 61 to the stage 300 may be simply referred to as a movement of the nozzle 61. In this embodiment, for example, moving the stage 300 in the +X-direction in relation to the nozzle 61 can be paraphrased as moving the nozzle 61 in the −X-direction. Similarly, a change in the relative position of the modeling unit 200 or the heating unit 700, described later, to the stage 300, may be simply referred to as a movement of the modeling unit 200 or the heating unit 700.

The heating unit 700 shown in FIGS. 1 and 2 is a member for heating the modeling material deposited on the deposition surface 311. The heating unit 700 in this embodiment is arranged at the outer circumference of the nozzle 61 and fixed to the modeling unit 200 via a support unit 205. The support unit 205 has a rectangular plate-like outer shape. A penetration hole in which the nozzle 61 is inserted is provided at the center of the support unit 205. The heating unit 700 is arranged parallel to the deposition surface 311. The heating unit 700 moves with the modeling unit 200 moved by the movement mechanism unit 400. That is, the heating unit 700 moves with the movement of the nozzle 61.

The heating unit 700 in this embodiment is formed by a heater and is configured to be able to uniformly heat the entire range of the deposition surface 311. More specifically, the area of the heating unit 700 is larger than the area of the deposition surface 311, and the outer peripheral edge of the heating unit 700 is arranged outside of a region where the stage 300 moves in relation to the nozzle 61, as viewed in the Z-direction. That is, no matter how the relative position between the heating unit 700 and the stage 300 is changed by the movement mechanism unit 400, the stage 300 is arranged inside of the outer peripheral edge of the heating unit 700, as viewed in the Z-direction. The heater forming the heating unit 700 may be, for example, a halogen heater, a nichrome wire heater, or a carbon heater, or may be a heater blowing hot air.

The measuring unit 600 shown in FIG. 2 is a member for measuring a first value and a second value, described later. The measuring unit 600 in this embodiment is formed by a shaft-like contact displacement sensor and has a main body part 601 and a contact maker 602. The contact maker 602 has a shaft-like shape and a distal end part thereof protrudes in the +Z-direction from inside the main body part 601 to outside the main body part 601. More specifically, the contact maker 602 is configured to be air-driven to slide along the Z-direction in relation to the main body part 601 in such a way as to be pushed into the main body part 601 or protrude to outside the main body part 601. The air driving the contact maker 602 is supplied from an air supply unit, not illustrated, to the main body part 601 via a tube or the like. The main body part 601 detects a change in the position of the contact maker 602 in relation to the main body part 601 due to the sliding, by a differential transformer. The detected change in the position of the contact maker 602 is transmitted to the control unit 500.

The measuring unit 600 in this embodiment is accommodated in a case 603. At a top surface 604 of the case 603, a hole 605 coinciding with the contact maker 602 as viewed along the Z-direction is provided. Via the hole 605, the contact maker 602 can protrude in the +Z-direction from inside the case 603 to outside the case 603 and can also return in the −Z-direction from outside the case 603 to inside the case 603. The measuring unit 600 and the case 603 are individually fixed to the stage 300 and are configured to be movable along the X-direction and the Y-direction with the movement of the stage 300 by the movement mechanism unit 400. Since the measuring unit 600 is accommodated in the case 603, the measuring unit 600 and the heating unit 700 are separated from each other by the case 603. Therefore, the heat of the heating unit 700 is restrained from affecting the measuring unit 600.

The measuring unit 600 is arranged at a position where the measuring unit 600 can face the distal end surface 63 of the nozzle 61. More specifically, the measuring unit 600 is fixed to the stage 300 with the distal end of the contact maker 602 facing in the +Z-direction and is configured to be able to face the distal end surface 63 by moving along the X-direction and the Y-direction with the movement of the stage 300. Similarly, the measuring unit 600 is configured to be able to face a reference surface 611 and an inspection surface 612 of the reference unit 610, described later.

FIG. 5 is a perspective view showing the configuration of the bottom side of the reference unit 610. As shown in FIGS. 2 and 5, the reference unit 610 is a member that is separate from the nozzle 61 and has the reference surface 611. The reference surface is a surface arranged at a position that corresponds to the deposition surface 311 in the Z-direction and where the reference surface can face the measuring unit 600. Also, the reference unit 610 in this embodiment has the inspection surface 612 arranged at a position that is spaced apart from the reference surface 611 by a predetermined distance in the Z-direction and where the inspection surface 612 can face the measuring unit 600. It can also be said that there is a predetermined height difference between the reference surface 611 and the inspection surface 612 in the Z-direction. In this embodiment, both the reference surface 611 and the inspection surface 612 are parallel to the deposition surface 311 and are arranged next to each other in the Y-direction. The inspection surface 612 is located in the +Z-direction of the reference surface 611, that is, higher than the reference surface 611. In FIG. 2, the inspection surface 612 is indicated by a dashed line.

The adjustment unit 620 shown in FIG. 2 adjusts the position in the Z-direction of the reference surface 611. The adjustment unit 620 in this embodiment is formed by an electric actuator moving the reference unit 610 along the Z-direction. More specifically, the reference unit 610 is fixed to a moving part 621 of the adjustment unit 620 via a fixing part. The adjustment unit 620 moves the moving part 621 along the Z-direction and thus moves the reference unit 610 along the Z-direction. The position in the Z-direction of the reference surface 611 is thus adjusted.

The reporting unit 800 reports information to a user. The reporting unit 800 in this embodiment is formed by a liquid crystal monitor coupled to the control unit 500. The reporting unit 800 displays visual information on the liquid crystal monitor and thus reports information. The reporting unit 800 reports, for example, a control state or the like of the three-dimensional modeling device 100, as the information. When the three-dimensional modeling device 100 is installed in a casing, for example, the reporting unit 800 may be arranged at an outer wall surface of the casing, as a monitor that is visible from outside the casing.

The control unit 500 is a control device controlling the operations of the entirety of the three-dimensional modeling device 100. The control unit 500 is formed by a computer having one or a plurality of processors, a memory, and an input/output interface inputting and outputting a signal from and to outside. The control unit 500 causes the processor to execute a program or a command read into a main storage device and thus achieves various functions such as a function of executing measurement processing, described later, and a function of executing three-dimensional modeling processing, described later. The control unit 500 may be implemented by a combination of a plurality of circuits for implementing at least a part of the various functions, instead of being formed by a computer. The control unit 500 may also be referred to as an information processing device.

FIG. 6 is a flowchart showing the measurement processing in this embodiment. The measurement processing refers to processing for measuring a first value that is a value about the distance between the measuring unit 600 and the reference surface 611 and a second value that is a value about the distance between the measuring unit 600 and the distal end surface 63. In this embodiment, the measurement processing is executed at the startup of the three-dimensional modeling device 100.

In step S110, the control unit 500 executes position adjustment processing for adjusting the position in the Z-direction of the reference surface 611. In this embodiment, in step S110, the control unit 500 controls the adjustment unit 620 to bring the reference surface 611 and the deposition surface 311 into contact with each other and thus causes the position in the Z-direction of the reference surface 611 and the position in the Z-direction of the deposition surface 311 to coincide with each other.

Figure 7:
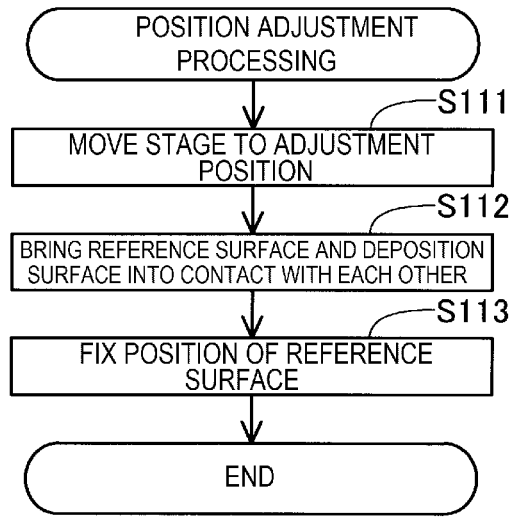
FIG. 7 is a flowchart showing position adjustment processing.
Figure 8:
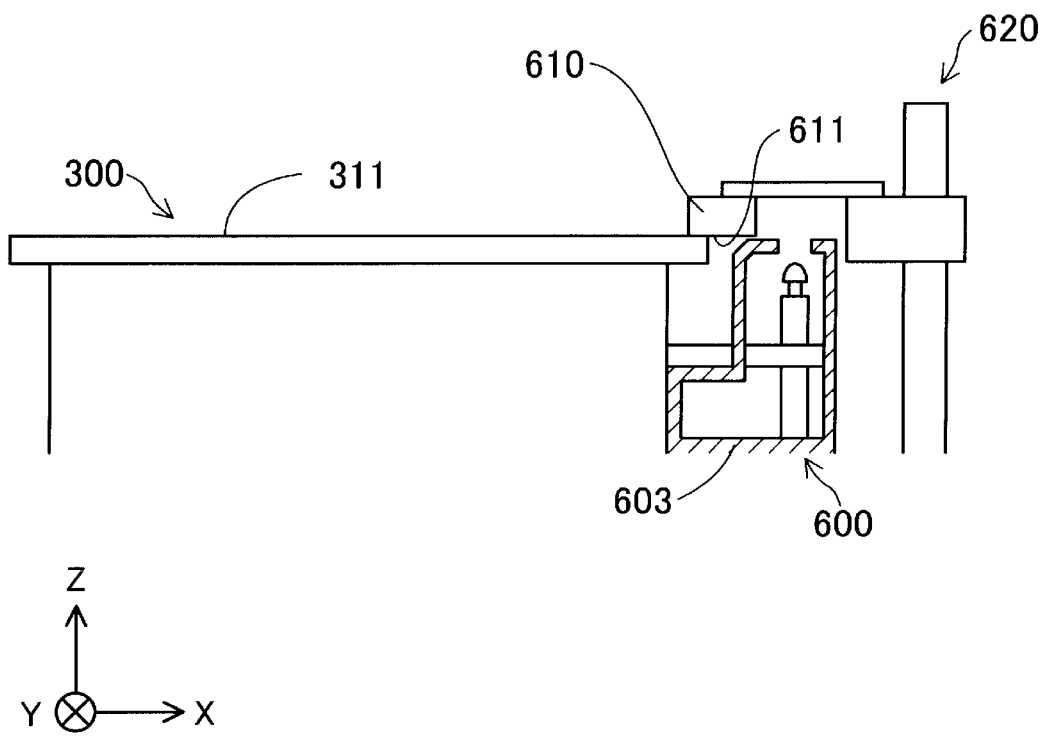
FIG. 8 explains the position adjustment processing.

FIG. 7 is a flowchart showing the position adjustment processing. FIG. 8 explains the position adjustment processing. In step S111 in FIG. 7, the control unit 500 controls the movement mechanism unit 400 to move the stage 300 to a predetermined adjustment position. The adjustment position refers to a position in the X-direction and the Y-direction for adjusting the position in the Z-direction of the reference surface 611. The adjustment position in this embodiment is a position where a part of the deposition surface 311 and a part of the reference surface 611 coincide with each other as viewed along the Z-direction. In step S112, the control unit 500 controls the adjustment unit 620 to move the reference unit 610 along the Z-direction and thus brings the reference surface 611 and the deposition surface 311 into contact with each other, as shown in FIG. 8. In step S113, the control unit 500 fixes the reference unit 610 at the position where the reference surface 611 and the deposition surface 311 come into contact with each other, and thus fixes the position of the reference surface 611. Thus, the position of the reference surface 611 is fixed in the state where the position in the Z-direction of the reference surface 611 and the position in the Z-direction of the deposition surface 311 are coincident with each other.

In step S120 in FIG. 6, the control unit 500 executes inspection processing for inspecting the accuracy of the measuring unit 600. In this embodiment, in step S120, the control unit 500 measures a value about the distance between the measuring unit 600 and the reference surface 611 and a value about the distance between the measuring unit 600 and the inspection surface 612, measures a height difference between the reference surface 611 and the inspection surface 612, and inspects the accuracy of the measuring unit 600, based on the measured height difference.

Figure 9:
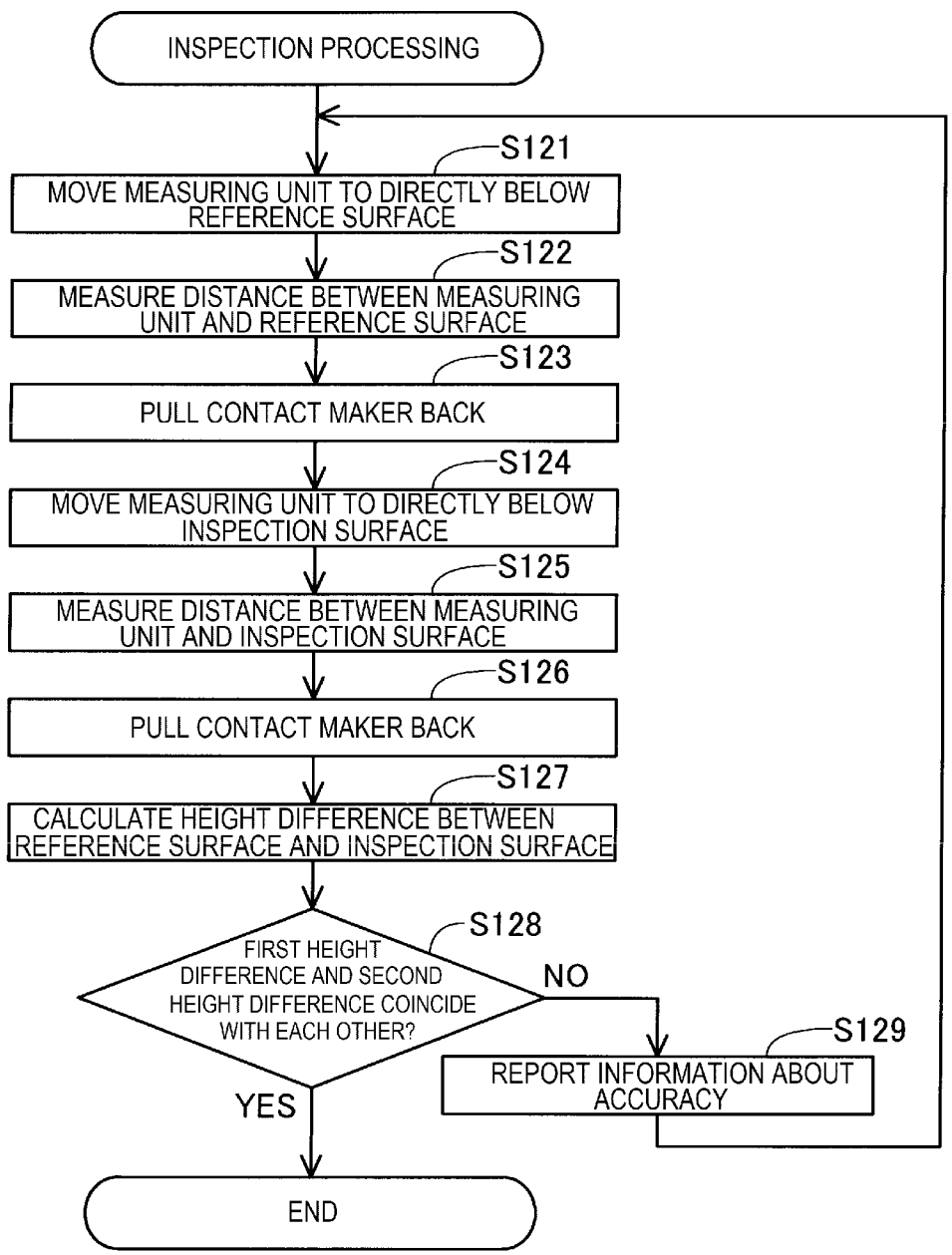
FIG. 9 is a flowchart showing inspection processing.
Figure 10:
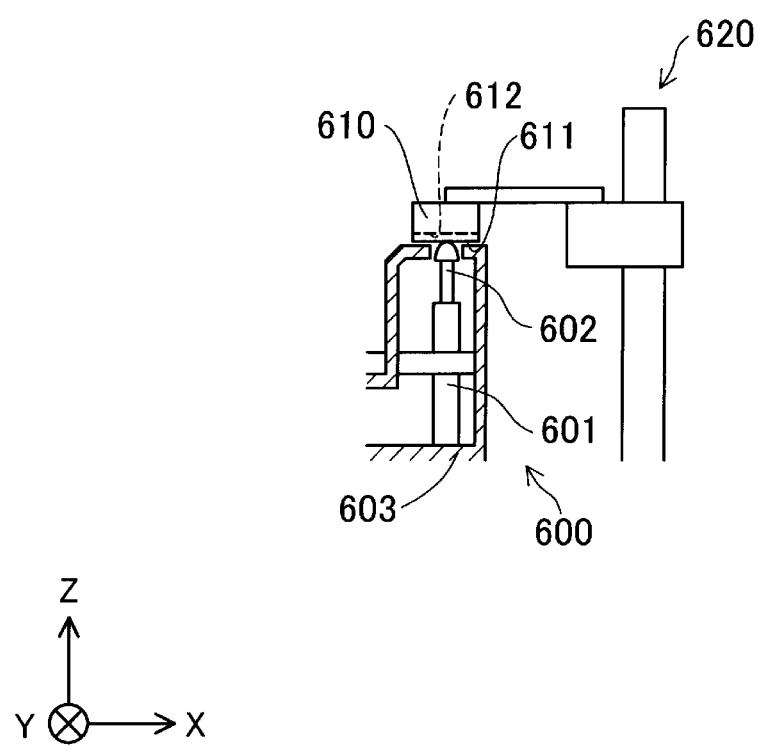
FIG. 10 is a first view explaining the inspection processing.

FIG. 9 is a flowchart showing the inspection processing. FIG. 10 explains the inspection processing. In FIG. 10, as in FIG. 2, the inspection surface 612 is indicated by a dashed line. In step S121 in FIG. 9, the control unit 500 controls the movement mechanism unit 400 to move the measuring unit 600 to directly below the reference surface 611 of the reference unit 610. In step S122, the control unit 500 controls the measuring unit 600 to bring the contact maker 602 and the reference surface 611 into contact with each other and thus measures the distance in the Z-direction between the measuring unit 600 and the reference surface 611, as the value about the distance between the measuring unit 600 and the reference surface 611. More specifically, in step S122, the control unit 500 supplies air to the main body part 601 to eject the contact maker 602 in the +Z-direction and brings the contact maker 602 and the reference surface 611 into contact with each other, as shown in FIG. 10, and thus acquires the position in the Z-direction of the contact maker 602 in relation to the main body part 601. The position in the Z-direction of the contact maker 602 corresponds to the position in the Z-direction of the reference surface 611. The control unit 500 measures the distance in the Z-direction between the measuring unit 600 and the reference surface 611, based on the difference between the positions in the Z-direction of the contact maker 602 before and after the ejection of the contact maker 602, and stores the measured distance in the memory. In step S123 in FIG. 9, the control unit 500 stops supplying air to the main body part 601 and pulls the contact maker 602 back in the −Z-direction.

In step S124, the control unit 500 controls the movement mechanism unit 400 to move the measuring unit 600 to directly below the inspection surface 612. In step S125, the control unit 500 controls the measuring unit 600 to detect the distance in the Z-direction between the measuring unit 600 and the inspection surface 612, as the value about the distance between the measuring unit 600 and the inspection surface 612. More specifically, in step S125, the control unit 500 brings the contact maker 602 and the inspection surface 612 into contact with each other, similarly to bringing the contact maker 602 and the reference surface 611 into contact with each other in step S122, and detects the position in the Z-direction of the contact maker 602 in relation to the main body part 601. The control unit 500 thus detects the position in the Z-direction of the inspection surface 612 and detects the distance in the Z-direction between the measuring unit 600 and the inspection surface 612. The distance detected in step S125 is stored in the memory of the control unit 500. Step S126 in FIG. 9 is similar to step S123.

In step S127, the control unit 500 calculates the difference between the distance between the measuring unit 600 and the reference surface 611 detected in step S122 and the distance between the measuring unit 600 and the inspection surface 612 detected in step S125 and thus calculates the height difference between the reference surface 611 and the inspection surface 612. In this way, in this embodiment, the control unit 500 executes steps S121 to S127 and thus causes the measuring unit 600 to measure the height difference between the reference surface 611 and the inspection surface 612. In the description below, the height difference between the reference surface 611 and the inspection surface 612 measured by the measuring unit 600 may be referred to as a first height difference.

In step S128, the control unit 500 determines whether the first height difference calculated in step S127 and a predetermined second height difference coincide with each other or not. In this embodiment, in step S128, the control unit 500 determines whether the first height difference and the second height difference coincide with each other within the range of a predetermined margin of error or not, and thus determines whether the first height difference and the second height difference coincide with each other or not. When determining that the first height difference and the second height difference coincide with each other within the range of the predetermined margin of error, the control unit 500 determines that the accuracy of the measuring unit 600 satisfies a predetermined condition, and ends the inspection processing. When determining that the two height differences do not coincide with each other, the control unit 500 determines that the accuracy of the measuring unit 600 does not satisfy the predetermined condition. The predetermined margin of error is, for example, 5% of the second height difference. In another embodiment, in step S128, the control unit 500 may determine, for example, whether the average value of a plurality of measured first height differences coincides with the second height difference or not. In this case, for example, the control unit 500 repeatedly executes steps S121 to S127 to measure the height difference a plurality of times and thus can calculate the average value of the first height differences. Also, in this case, the control unit 500 may change the position in the X-direction and the Y-direction of the reference surface 611, which the contact maker 602 is brought into contact with, and the position in the X-direction and the Y-direction of the inspection surface 612, which the contact maker 602 is brought into contact with, every time the first height difference is measured. The second height difference may be decided, for example, based on the design dimensions of the reference surface 611 and the inspection surface 612, or may be decided, based on actual measured values of the dimensions of the reference surface 611 and the inspection surface 612 measured in advance using a vernier caliper or the like.

When determining in step S128 that the accuracy of the measuring unit 600 does not satisfy the predetermined condition, the control unit 500 in step S129 controls the reporting unit 800 to report information about the accuracy of the measuring unit 600. In this embodiment, in step S129, the control unit 500 controls the reporting unit 800 to report, to the user, that the accuracy of the measuring unit 600 does not satisfy the predetermined condition. In step S129, the control unit 500 also advises the user to maintain or replace the measuring unit 600 and causes the three-dimensional modeling device 100 to wait until the measuring unit 600 is maintained or replaced. Subsequently, the control unit 500 returns the processing to step S121.

In a measurement process of step S130 in FIG. 6, the control unit 500 controls the measuring unit 600 to measure the first value and the second value. In the description below, the process of measuring the first value by the measuring unit 600 may be referred to as a first process, and the process of measuring the second value by the measuring unit 600 may be referred to as a second process.

Figure 11:
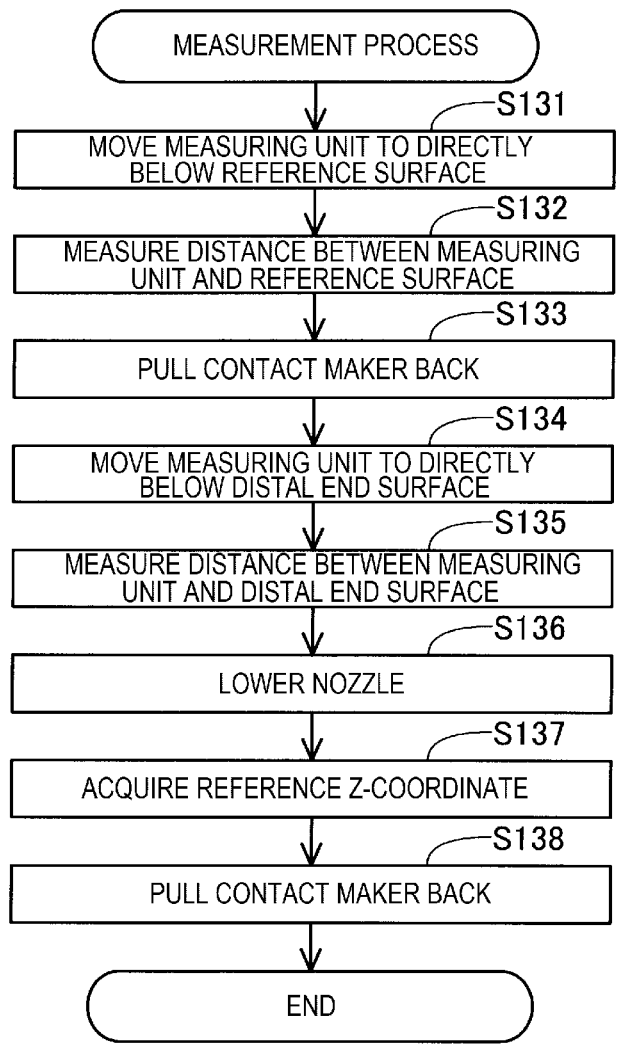
FIG. 11 is a flowchart showing a measurement process.

FIG. 11 is a flowchart showing the measurement process. Steps S131 to S133 in FIG. 11 are equivalent to the first process. Steps S134 to S138 are equivalent to the second process. Steps S131 and S132 in FIG. 11 are similar to steps S121 and S122 in FIG. 9. In this embodiment, the control unit 500 executes step S132, thus detects the position in the Z-direction of the reference surface 611 in relation to the position in the Z-direction of the measuring unit 600, and measures the distance in the Z-direction between the measuring unit 600 and the reference surface 611, as the first value. The measured first value is stored in the memory of the control unit 500. Step S133 is similar to step S123 in FIG. 9 and therefore will not be described further.

Figure 12:
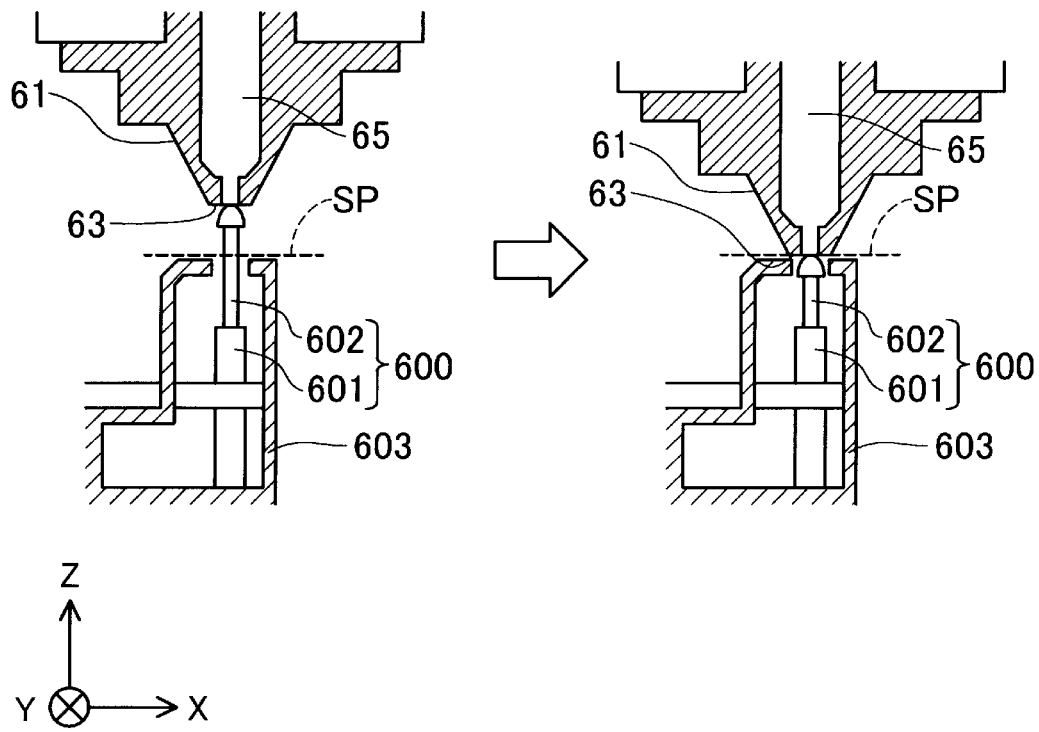
FIG. 12 explains a second process.

FIG. 12 explains the second process. In FIG. 12, a position SP in the Z-direction of the reference surface 611 is indicated by a dashed line. In step S134 in FIG. 11, the control unit 500 controls the movement mechanism unit 400 to move the measuring unit 600 to directly below the distal end surface 63 of the nozzle 61. In step S135, the control unit 500 controls the measuring unit 600 to detect the position in the Z-direction of the distal end surface 63 in relation to the position in the Z-direction of the measuring unit 600 and thus measures the distance in the Z-direction between the measuring unit 600 and the distal end surface 63, as the second value. More specifically, in step S135, the control unit 500 ejects the contact maker 602 in the +Z-direction to bring the contact maker 602 and the distal end surface 63 into contact with each other, as shown in the left part of FIG. 12, then detects the position in the Z-direction of the contact maker 602 in relation to the main body part 601 so as to detect the position in the Z-direction of the distal end surface 63, and measures the distance in the Z-direction between the measuring unit 600 and the distal end surface 63.

In step S136, the control unit 500 controls the movement mechanism unit 400 to lower the nozzle 61 and the contact maker 602 and thus causes the position in the Z-direction of the distal end surface 63 of the nozzle 61 and the position SP in the Z-direction of the reference surface 611 to coincide with each other, as shown in the right part of FIG. 12. More specifically, in step S136, the control unit 500 moves the nozzle 61 in the −Z-direction to push the contact maker 602 down in the −Z-direction while measuring the second value, and causes the second value to coincide with the first value stored in the memory in step S133 in FIG. 11. In step S137, the control unit 500 acquires a reference Z-coordinate, which is the Z-coordinate of the nozzle 61 based on a control value of the movement mechanism unit 400 in the state where the second value and the first value are coincident with each other, and the control unit 500 stores the reference Z-coordinate in the memory. In the description below, the Z-coordinate of the nozzle 61 based on the control value of the movement mechanism unit 400 may be simply referred to as the Z-coordinate of the nozzle 61. Step S138 is similar to step S133 and therefore will not be described further.

Figure 13:
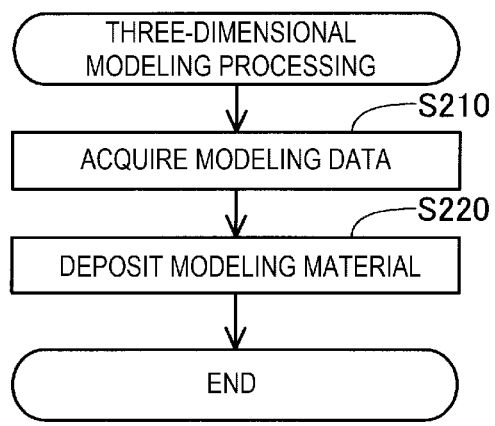
FIG. 13 is a flowchart showing three-dimensional modeling processing.

FIG. 13 is a flowchart showing the three-dimensional modeling processing in this embodiment. The three-dimensional modeling processing refers to processing for modeling a three-dimensional modeled object. The control unit 500 executes the three-dimensional modeling processing after the completion of the measurement processing. For example, the control unit 500 may execute the three-dimensional modeling processing immediately after the completion of the measurement processing or may accept an input of an operation to start the three-dimensional modeling processing after the completion of the measurement processing. The three-dimensional modeling processing may be simply referred to as modeling processing. In this embodiment, the measurement processing shown in FIG. 6 and the three-dimensional modeling processing shown in FIG. 13 are executed, thus implementing the method for manufacturing a three-dimensional modeled object by the three-dimensional modeling device 100.

In step S210 in FIG. 13, the control unit 500 acquires modeling data from an external computer, recording medium or the like. The modeling data includes modeling path data representing a movement path of the nozzle 61 for each layer forming the three-dimensional modeled object. The modeling path data is associated with amount-of-ejection data representing an amount of ejection of the material ejected from the nozzle 61.

In step S220, the control unit 500 controls the modeling unit 200 and the movement mechanism unit 400 according to the modeling data acquired in step S210 so as to deposit the modeling material on the deposition surface 311 and model the three-dimensional modeled object. In step S220, the control unit 500 also suitably controls the heating unit 700 to heat the modeling material deposited on the deposition surface 311. The process of modeling the three-dimensional modeled object by changing the relative position between the nozzle 61 ejecting the modeling material and the stage 300 as in step S220 may be referred to as a third process.

In this embodiment, in step S220, the control unit 500 decides the distance between the distal end surface 63 and the deposition surface 311 for when modeling the three-dimensional modeled object, based on the first value and the second value. More specifically, the control unit 500 decides the distance between the distal end surface 63 and the deposition surface 311, based on the reference Z-coordinate acquired based on the first value and the second value in step S137 in FIG. 11. For example, in step S220, when setting the distance between the distal end surface 63 and the deposition surface 311 to a distance D, the control unit 500 decides the value of the reference Z-coordinate plus the distance D, as the value of the Z-coordinate of the nozzle 61, and thus can set the distance between the distal end surface 63 and the deposition surface 311 to the distance D.

In the foregoing three-dimensional modeling device 100 according to this embodiment, the control unit 500 measures the first value, which is the value about the distance between the measuring unit 600 and the reference surface 611, and the second value, which is the value about the distance between the measuring unit 600 and the distal end surface 63, and decides the distance between the distal end surface 63 and the deposition surface 311 for when modeling the three-dimensional modeled object, based on the first value and the second value that are measured. Thus, the replacement or reattachment of the measuring unit 600 due to the replacement or the like of the modeling unit 200 is restrained. Also, since the distance between the distal end surface 63 and the deposition surface 311 is decided based on the first value and the second value, which are actual measured values, to model the three-dimensional modeled object, the probability of being able to model the three-dimensional modeled object with high accuracy increases.

In this embodiment, the three-dimensional modeling device 100 has the heating unit 700 moving with the movement of the nozzle 61. The distal end surface 63 of the nozzle 61 is located between the heating unit 700 and the deposition surface 311 in the Z-direction. Therefore, as the heating unit 700 heats the modeling material deposited on the deposition surface 311, the adhesiveness between the modeling materials can be increased and the strength of the three-dimensional modeled object can be increased. Also, the probability of the heating unit 700 coming into contact with the modeling material deposited on the deposition surface 311 is lower than in the case where the heating unit 700 is located between the distal end surface 63 and the deposition surface 311 in the Z-direction. Therefore, the probability of being able to model the three-dimensional modeled object with high accuracy increases.

In this embodiment, the control unit 500 brings the measuring unit 600 and the reference surface 611 into contact with each other and thus measures the first value. Therefore, the first value can be measured accurately by simple control.

In this embodiment, the control unit 500 brings the measuring unit 600 and the distal end surface 63 into contact with each other and thus measures the second value. Therefore, the second value can be measured accurately by simple control.

In this embodiment, the control unit 500 controls the measuring unit 600 to measure the height difference between the reference surface 611 and the inspection surface and inspects the accuracy of the measuring unit 600, based on the measured height difference. Therefore, the accuracy of the measuring unit 600 can be inspected easily.

In this embodiment, when the accuracy of the measuring unit 600 does not satisfy the predetermined condition, the control unit 500 controls the reporting unit 800 to report information about the accuracy of the measuring unit 600. Thus, the user can execute, for example, replacement or maintenance of the measuring unit 600, based on the information reported by the reporting unit 800. Therefore, the reliability of the first value and the second value measured by the measuring unit 600 can be increased.

In this embodiment, the movement mechanism unit 400 moves the nozzle 61 in the Z-direction in relation to the stage 300, moves the stage 300 in the X-direction and the Y-direction in relation to the nozzle 61, and thus changes the relative position between the nozzle 61 and the stage 300. Thus, since the stage 300 need not be moved in the Z-direction in relation to the nozzle 61, the reference surface 611 can be more easily located at a position corresponding to the deposition surface 311 in the Z-direction than when, for example, the stage 300 is moved in the Z-direction in relation to the nozzle 61. Therefore, the first value can be measured by a simple configuration.

In another embodiment, the control unit 500 may not execute the measurement processing every time the three-dimensional modeling device 100 is started up or every time before the start of the modeling processing. For example, the control unit 500 may execute the modeling processing a plurality of times after the measurement processing is completed once. The measurement processing may also be executed at any timing desired by the user, such as when a start operation is accepted from the user, for example. Preferably, when not executing the measurement processing every time the three-dimensional modeling device 100 is started up or every time before the start of the modeling processing, the control unit 500 executes the measurement processing at a timing when the relative position between the nozzle 61 and the stage 300 or the Z-coordinate of the nozzle 61 changes, such as after the maintenance of the modeling unit 200, the stage 300, and the movement mechanism unit 400, for example.

The material of the three-dimensional modeled object used in the three-dimensional modeling device 100 will now be described. The three-dimensional modeling device 100 can model a three-dimensional modeled object, for example, using various materials such as a thermoplastic material, a metal material, and a ceramic material, as a principal material. The "principal material" refers to a main material forming the shape of the three-dimensional modeled object and refers to a material whose content rate in the three-dimensional modeled object is 50% by weight or more. The modeling material includes a single one of such principal materials in a molten state, or a part of a component contained along with the principal component in a molten and paste-like state.

When using a thermoplastic material as the principal material, the plasticizing unit 30 plasticizes this material to form the modeling material. As the thermoplastic material, for example, the following thermoplastic resin materials can be used.

Examples of Thermoplastic Resin Materials

Examples of the thermoplastic resin materials are general-purpose engineering plastics such as polypropylene resin (PP), polyethylene resin (PE), polyacetal resin (POM), polyvinyl chloride (PVC), polyamide resin (PA), acrylonitrile butadiene styrene resin (ABS), polylactic acid resin (PLA), polyphenylene sulfide resin (PPS), polyether ether ketone (PEEK), polycarbonate (PC), modified polyphenylene ether, polybutylene terephthalate, and polyethylene terephthalate, and engineering plastics such as polysulfone, polyether sulfone, polyphenylene sulfide, polyarylate, polyimide, polyamide imide, polyether imide, and polyether ether ketone.

A pigment, a metal, a ceramic, and also an additive such as a wax, a flame retardant, an antioxidant, or a heat stabilizer may be mixed in the thermoplastic material. In the plasticizing unit 30, the thermoplastic material is plasticized and transformed into a molten state by the rotation of the screw 40 and the heating by the heater 58.

It is desirable that the thermoplastic material is heated to the glass transition point thereof or above and ejected from the nozzle 61 in a completely molten state. For example, in the case where an ASB resin is used, it is desirable that the ASB resin is approximately 200° C. when ejected from the nozzle 61.

In the three-dimensional modeling device 100, for example, the metal materials described below may be used as the principal material, instead of the thermoplastic material. In this case, it is desirable that a component that melts when generating the modeling material is mixed in a powder material formed of the metal materials described below in a powdered state and that the resulting material is put into the plasticizing unit 30 as a material MR.

Examples of Metal Materials

A single metal of magnesium (Mg), iron (Fe), cobalt (Co), chromium (Cr), aluminum (Al), titanium (Ti), copper (Cu), and nickel (Ni), or an alloy containing one or more of these metals may be used.

Examples of Alloy

Examples of the alloy are maraging steel, stainless steel, cobalt-chromium-molybdenum, titanium alloy, nickel alloy, aluminum alloy, cobalt alloy, and cobalt-chromium alloy.

In the three-dimensional modeling device 100, a ceramic material can be used as the principal material, instead of the metal material. As the ceramic material, for example, an oxide ceramic such as silicon dioxide, titanium dioxide, aluminum oxide, or zirconium oxide, or a non-oxide ceramic such as aluminum nitride, or the like, can be used. When the metal material or the ceramic material as described above is used as the principal material, the modeling material ejected onto the stage 300 may be hardened by sintering.

The powder material formed of the metal material or the ceramic material put into the material supply unit 20 as the material MR may be a mixed material formed of a mixture of a plurality of types of a powder of a single metal, a powder of an alloy, and a powder of a ceramic material. The powder material formed of the metal material or the ceramic material may be coated, for example, with the thermoplastic resin as described above or other thermoplastic resins. In this case, the thermoplastic resin may melt and become fluid in the plasticizing unit 30.

A solvent as described below, for example, can be added to the powder material formed of the metal material or the ceramic material put in the material supply unit 20 as the material MR. As the solvent, one type or a combination of two or more types selected from among the solvents listed below can be used.

Examples of Solvent

Examples of the solvent are: water; (poly)alkylene glycol monoalkyl ethers such as ethylene glycol monomethyl ether, ethylene glycol monoethyl ether, propylene glycol monomethyl ether, and propylene glycol monoethyl ether; acetate esters such as ethyl acetate, n-propyl acetate, isopropyl acetate, n-butyl acetate, and isobutyl acetate; aromatic hydrocarbons such as benzene, toluene, and xylene; ketones such as methyl ethyl ketone, acetone, methyl isobutyl ketone, ethyl-n-butyl ketone, diisopropyl ketone, and acetyl acetone; alcohols such as ethanol, propanol, and butanol; tetra alkyl ammonium acetates; sulfoxide-based solvent such as dimethyl sulfoxide or diethyl sulfoxide; pyridine-based solvent such as pyridine, γ-picoline, or 2,6-lutidine; tetra alkyl ammonium acetate such as tetra butyl ammonium acetate; and ionic liquid such as butyl carbitol acetate.

Also, a binder as described below, for example, can be added to the powder material formed of the metal material or the ceramic material put in the material supply unit 20 as the material MR.

Examples of Binder

Examples of the binder are acrylic resin, epoxy resin, silicone resin, cellulose-based resin or other synthetic resins, or PLA (polylactic acid), PA (polyamide), PPS (polyphenylene sulfide), PEEK (polyether ether ketone) or other thermoplastic resins.

B. Second Embodiment

FIG. 14 is a flowchart showing measurement processing in a second embodiment. In this embodiment, unlike in the first embodiment, the control unit 500 controls the heating unit 700 to start heating the stage 300 and subsequently controls the adjustment unit 620 to cause the position in the Z-direction of the reference surface 611 and the position in the Z-direction of the deposition surface 311 to coincide with each other before measuring the first value and the second value. In FIG. 14, processes similar to the processes in the measurement processing shown in FIG. 6 are denoted by the same reference signs as in FIG. 6. Of the configuration of the three-dimensional modeling device 100 according to this embodiment, components that are not particularly explained are similar to those in the first embodiment.

In step S105, the control unit 500 controls the heating unit 700 to start heating the stage 300. In this embodiment, in step S105, the control unit 500 turns on the heater of the heating unit 700. As shown in FIG. 14, step S105 is executed before the measurement process executed in step S130.

In step S110, the control unit 500 executes the position adjustment processing shown in FIG. 7, as in the first embodiment. The position adjustment processing executed in this embodiment is similar to the position adjustment processing in the first embodiment except for being executed after the heating of the stage 300 by the heating unit 700 is started.

In the foregoing three-dimensional modeling device 100 according to this embodiment, too, the replacement or reattachment of the measuring unit 600 due to the replacement of the modeling unit 200 is restrained. Also, since the distance between the distal end surface 63 and the deposition surface 311 can be decided based on the first value and the second value, which are actual measured values, the probability of being able to model the three-dimensional modeled object with high accuracy increases. Particularly in this embodiment, the control unit 500 controls the heating unit 700 to start heating the stage 300 and subsequently controls the adjustment unit 620 to cause the position in the Z-direction of the reference surface 611 and the position in the Z-direction of the deposition surface 311 to coincide with each other before measuring the first value and the second value. Thus, the first value and the second value are measured in the state where the position in the Z-direction of the reference surface 611 is coincident with the position in the Z-direction of the deposition surface 311 of the heated stage 300. Therefore, in the configuration where the modeling material deposited on the deposition surface 311 is heated by the heating unit 700 to model the three-dimensional modeled object, the probability of being able to model the three-dimensional modeled object with higher accuracy increases.

FIG. 15 explains an example of the position adjustment processing in another embodiment. As shown in FIG. 15, the control unit 500 may bring the deposition surface 311 and the reference surface 611 into contact with each other indirectly, instead of directly, and thus cause the position in the Z-direction of the reference surface 611 and the position in the Z-direction of the deposition surface 311 to coincide with each other. The example in FIG. 15 shows a state where a parallel member PR is placed at the deposition surface 311. The parallel member PR has a surface PP1 parallel to the deposition surface 311 and is placed at the deposition surface 311 in such a way that the deposition surface 311 and a part of the surface PP1 are in contact with each other. In the parallel member PR, a part that is not in contact with the deposition surface 311, of the surface PP1, is exposed facing the −Z-direction at an end part in the +X-direction. At an end part in the X-direction of the parallel member PR, a block gauge BG having a surface PP2 parallel to the deposition surface 311 is fixed by a cable tie ZT. More specifically, the block gauge BG is fixed to the parallel member PR in such a way that the exposed part of the surface PP1 and a part of the surface PP2 are in contact with each other. In the block gauge BG, a part that is not in contact with the surface PP1, of the surface PP2, is exposed facing the +Z-direction at an end part in the +X-direction. The exposed part of the surface PP2 is located on the same plane as a plane including the deposition surface 311. Therefore, in step S112 of the position adjustment processing shown in FIG. 7, the control unit 500 brings the reference surface 611 and the exposed part of the surface PP2 into contact with each other to bring the reference surface 611 and the deposition surface 311 into contact with each other indirectly and thus can cause the position in the Z-direction of the reference surface 611 and the position in the Z-direction of the deposition surface 311 to coincide with each other, as shown in FIG. 15. In this configuration, the control unit 500 can control, for example, a robot or the like, not illustrated, to place the parallel member PR at the top of the deposition surface 311. As the parallel member PR, for example, an I-shaped straight ruler or the like can be used.

C. Third Embodiment

Figure 16:
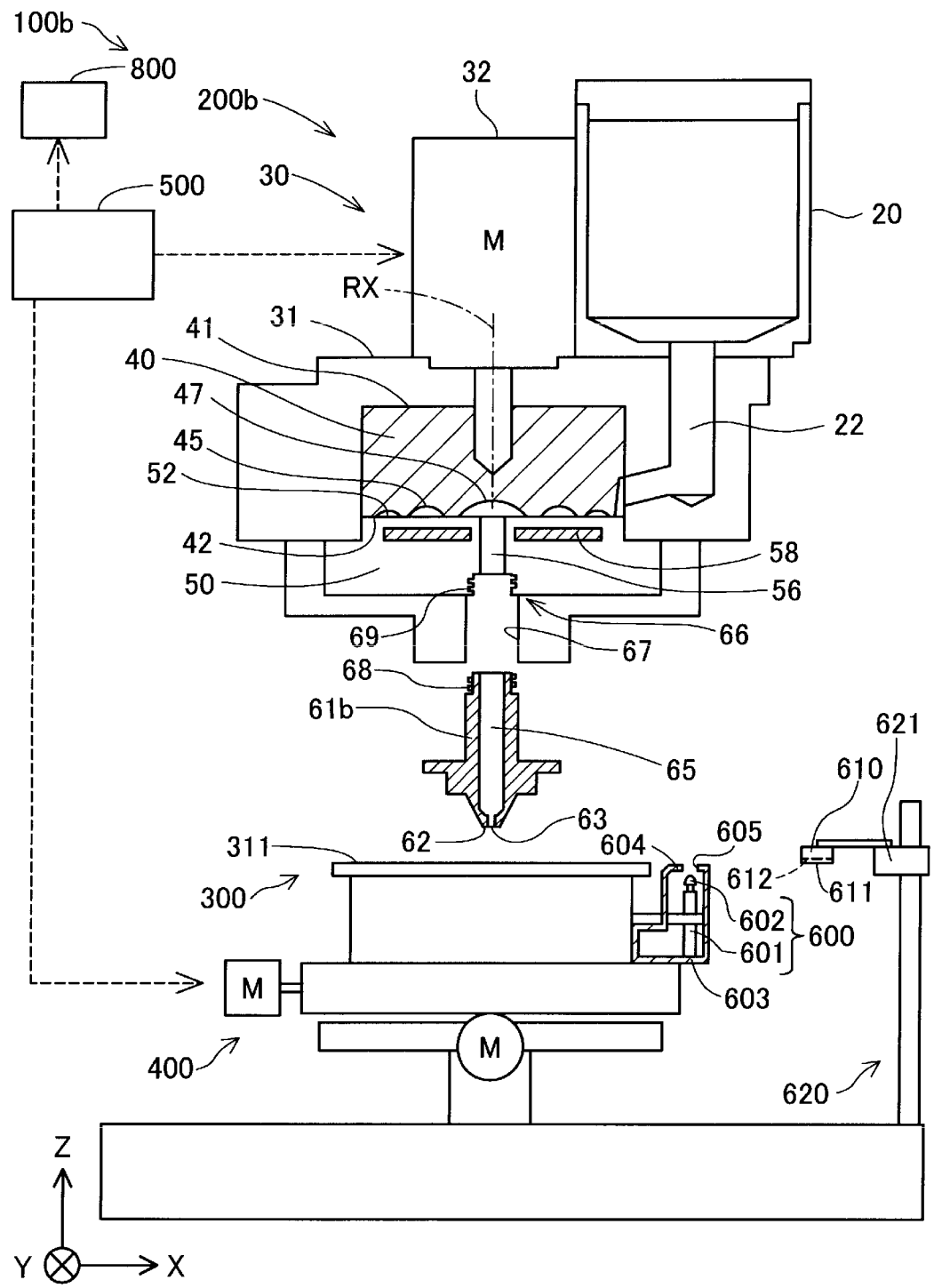
FIG. 16 shows a schematic configuration of a three-dimensional modeling device according to a third embodiment.

FIG. 16 shows a schematic configuration of a three-dimensional modeling device 100*b* according to a third embodiment. Unlike in the first embodiment, a modeling unit 200*b* in this embodiment has an attachment/detachment part 66 configured to be able to attach and detach a nozzle 61*b*. After the nozzle 61*b* is attached to the attachment/detachment part 66, the control unit 500 measures the first value and the second value before starting the modeling of a three-dimensional modeled object. Of the configuration of the three-dimensional modeling device 100*b* according to this embodiment, components that are not particularly explained are similar to those in the first embodiment. In FIG. 16, the heating unit 700 is omitted.

In this embodiment, the attachment/detachment part 66 has a hole part 67 in which the nozzle 61*b* is inserted. At a side surface of the hole part 67, a second screw part 69 to be engaged with a first screw part 68 provided at a side surface of the nozzle 61*b* is provided. The nozzle 61*b* is inserted in the hole part 67. The first screw part 68 and the second screw part 69 are engaged with each other. The nozzle flow path 65 and the communication hole 56 are thus coupled together. The nozzle 61*b* is thus attached to the modeling unit 200*b*. When the first screw part 68 and the second screw part 69 are disengaged from each other in the state where the nozzle 61*b* is attached and the nozzle 61*b* is then pulled out of the hole part 67, the nozzle 61*b* is detached from the modeling unit 200*b* at the attachment/detachment part 66.

The control unit 500 executes the measurement processing shown in FIG. 6, as in the first embodiment, after the nozzle 61b is attached to the attachment/detachment part 66. Subsequently, the control unit 500 executes the three-dimensional modeling processing shown in FIG. 13, as in the first embodiment. The control unit 500 may detect, for example, that the nozzle 61b is attached to the modeling unit 200b by a sensor. Also, for example, when the nozzle 61b has an IC chip configured to be able to be electrically coupled to the control unit 500 in the state of being attached to the modeling unit 200b, the control unit 500 may determine that the nozzle 61b is attached to the modeling unit 200b when electrical coupling between the IC chip of the nozzle 61b and the control unit 500 is detected, and thus may execute the measurement processing.

In the foregoing three-dimensional modeling device 100b according to this embodiment, too, the replacement or reattachment of the measuring unit 600 due to the replacement of the modeling unit 200b is restrained. Also, since the distance between the distal end surface 63 and the deposition surface 311 can be decided based on the first value and the second value, which are actual measured values, the probability of being able to model the three-dimensional modeled object with high accuracy increases. Particularly in this embodiment, the modeling unit 200b has the attachment/detachment part 66 configured to be able to attach and detach the nozzle 61b, and after the nozzle 61b is attached to the attachment/detachment part 66, the control unit 500 measures the first value and the second value before starting the modeling of the three-dimensional modeled object. Thus, the second value measured by the measuring unit 600 reflects a change in the position in the Z-direction of the nozzle 61b due to attachment/detachment. Therefore, even in the configuration where the nozzle 61b is configured to be attachable/detachable, the probability of being able to model the three-dimensional modeled object with high accuracy increases.

D. Fourth Embodiment

Figure 17:
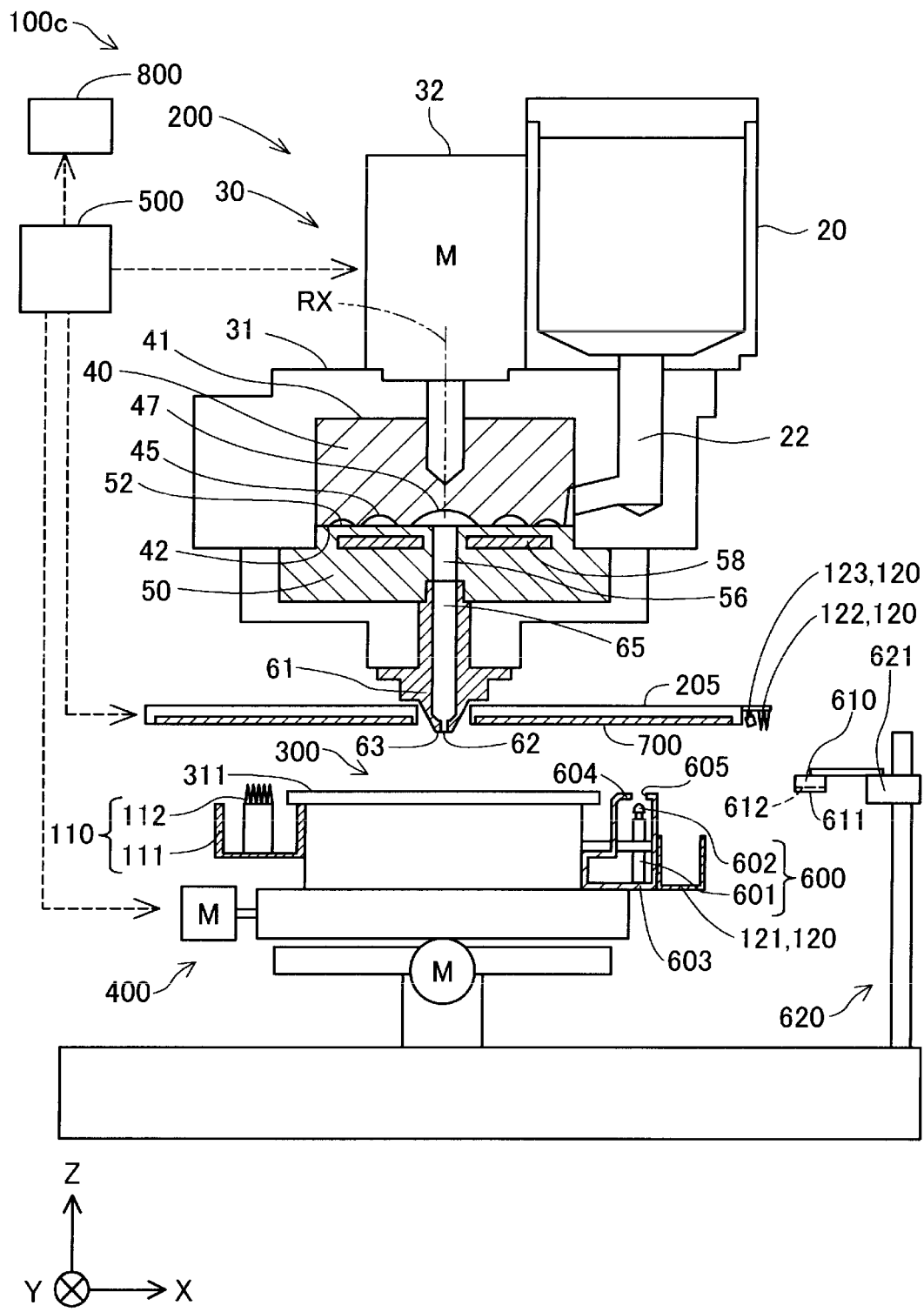
FIG. 17 shows a schematic configuration of a three-dimensional modeling device according to a fourth embodiment.

FIG. 17 shows a schematic configuration of a three-dimensional modeling device 100c according to a fourth embodiment. As shown in FIG. 17, unlike in the first embodiment, the three-dimensional modeling device 100c according to this embodiment has a first cleaning unit 110 cleaning the distal end surface 63 of the nozzle 61 and a second cleaning unit 120 cleaning the measuring unit 600. The control unit 500 causes the first cleaning unit 110 to clean the distal end surface 63 before measuring the second value and causes the second cleaning unit 120 to clean the measuring unit 600 before measuring the first value and the second value. Of the configuration of the three-dimensional modeling device 100c according to this embodiment, components that are not particularly explained are similar to those in the first embodiment.

As shown in FIG. 17, the first cleaning unit 110 has a first waste material accommodation part 111 and a first cleaning member 112. The first cleaning member 112 is a member for coming into contact with the distal end surface 63 and thus cleaning the distal end surface 63. In this embodiment, the first cleaning member 112 is formed by a brush-like member. The first waste material accommodation part 111 is a box-like member with an open top and is a member for accommodating a material that is a foreign matter removed from the distal end surface 63 by the contact between the distal end surface 63 and the first cleaning member 112.

The first waste material accommodation part 111 is fixed to the stage 300. The first cleaning member 112 is fixed to the first waste material accommodation part 111 via a support part arranged inside the first waste material accommodation part 111. Thus, the first cleaning unit 110 in this embodiment is configured to be movable in the X-direction and the Y-direction with the movement of the stage 300 in the X-direction and the Y-direction.

Preferably, the Vickers hardness of the first cleaning member 112 is lower than the Vickers hardness of the distal end surface 63. For example, the nozzle 61 is formed of a metal such as super hard alloy, tool steel or SUS, and for example, the first cleaning member 112 is formed of a metal such as SUS, iron or brass. Since the Vickers hardness of the first cleaning member 112 is lower than the Vickers hardness of the distal end surface 63, the wear of the distal end surface 63 due to the contact between the first cleaning member 112 and the distal end surface 63 is restrained. In another embodiment, the first cleaning member 112 may be formed by a spatula-like member, for example.

The second cleaning unit 120 has a second waste material accommodation part 121, a second cleaning member 122, and a blower 123. The second cleaning member 122 is a member for coming into contact with the measuring unit 600 and thus cleaning the measuring unit 600. In this embodiment, the second cleaning member 122 is formed by a brush-like member. More specifically, the second cleaning member 122 in this embodiment comes into contact with the contact maker 602 of the measuring unit 600 and thus cleans the surface of the contact maker 602. The second waste material accommodation part 121 is a box-like member with an open top and is a member for accommodating a material that is a foreign matter removed from the surface of the contact maker 602 by the contact between the contact maker 602 and the second cleaning member 122. The blower 123 is configured to be able to blow air toward the distal end of the second cleaning member 122 and guides the material removed from the surface of the contact maker 602 by the contact between the contact maker 602 and the second cleaning member 122, to the second waste material accommodation part 121 by the blown air.

The second waste material accommodation part 121 in this embodiment is fixed to the measuring unit 600 in the +X-direction of the measuring unit 600 and is configured to be movable in the X-direction and the Y-direction along with the measuring unit 600, with the movement of the stage 300. The second cleaning member 122 and the blower 123 are fixed to the support unit 205 in the +X-direction of the support unit 205.

Preferably, the Vickers hardness of the second cleaning member 122 is lower than the Vickers hardness of the part in contact with the second cleaning member 122, of the measuring unit 600. That is, in this embodiment, preferably, the Vickers hardness of the second cleaning member 122 is lower than the Vickers hardness of the contact maker 602. For example, the contact maker 602 is formed of a metal such as SUS, and for example, the second cleaning member 122 is formed of a metal such as SUS, iron or brass. Since the Vickers hardness of the second cleaning member 122 is lower than the Vickers hardness of the contact maker 602, the wear of the contact maker 602 due to the contact between the second cleaning member 122 and the contact maker 602 is restrained. In another embodiment, the second cleaning member 122 may be formed by a spatula-like member, for example.

Figure 18:
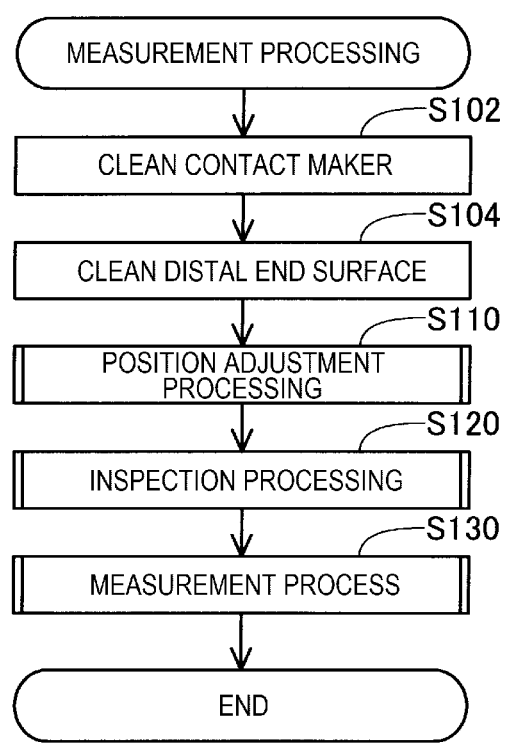
FIG. 18 is a flowchart showing measurement processing in the fourth embodiment.

FIG. 18 is a flowchart showing measurement processing in the fourth embodiment. In FIG. 18, processes similar to the processes in the measurement processing shown in FIG. 6 are denoted by the same reference signs as in FIG. 6.

In step S102, the control unit 500 causes the second cleaning member 122 to clean the surface of the contact maker 602. In step S102, the control unit 500 first controls the movement mechanism unit 400 to move the measuring unit 600 to directly below the second cleaning member 122. Next, the control unit 500 causes the blower 123 to start blowing air to eject the contact maker 602 in the +Z-direction and thus brings the contact maker 602 and the second cleaning member 122 into contact with each other. When bringing the contact maker 602 and the second cleaning member 122 into contact with each other, the control unit 500 may eject the contact maker 602 in the +Z-direction and may also control the movement mechanism unit 400 to move the second cleaning member 122 in the −Z-direction. The control unit 500 then controls the movement mechanism unit 400 to repeatedly move the measuring unit 600 back and forth in the X-direction or the Y-direction in the state where the contact maker 602 and the second cleaning member 122 are in contact with each other, and thus moves the contact maker 602 in such a way as to rub the contact maker 602 against the second cleaning member 122. After the cleaning of the contact maker 602 is completed, the control unit 500 stops the blower 123 from blowing air and pulls the contact maker 602 back in the −Z-direction.

In step S104, the control unit 500 causes the first cleaning member 112 to clean the distal end surface 63. In step S104, the control unit 500 first controls the movement mechanism unit 400 to move the first cleaning member 112 to directly below the distal end surface 63 of the nozzle 61. Next, the control unit 500 controls the movement mechanism unit 400 to move the nozzle 61 in the −Z-direction and thus brings the distal end surface 63 and the first cleaning member 112 into contact with each other. The control unit 500 then controls the movement mechanism unit 400 to repeatedly move the first cleaning member 112 back and forth in the X-direction or the Y-direction in the state where the distal end surface 63 and the first cleaning member 112 are in contact with each other, and thus moves the first cleaning member 112 in such a way as to rub the first cleaning member 112 against the distal end surface 63. After the completion of step S104, the control unit 500 executes the position adjustment processing of step S110, the inspection processing of step S120, and the measurement process of step S130, as in the first embodiment.

In the foregoing three-dimensional modeling device 100c according to this embodiment, too, the replacement or reattachment of the measuring unit 600 due to the replacement of the modeling unit 200 is restrained. Also, since the distance between the distal end surface 63 and the deposition surface 311 can be decided based on the first value and the second value, which are actual measured values, the probability of being able to model the three-dimensional modeled object with high accuracy increases. Particularly in this embodiment, the control unit 500 causes the first cleaning unit 110 to clean the distal end surface 63 before measuring the second value. Since the second value is measured in the state where the distal end surface 63 is cleaned, a foreign matter adhering to the distal end surface 63 is restrained from affecting the measured second value. Thus, the probability of being able to more accurately measure the second value increases and the probability of being able to model the three-dimensional modeled object with high accuracy increases further.

In this embodiment, the control unit 500 causes the second cleaning unit 120 to clean the measuring unit 600 before measuring the first value and the second value. Since the first value and the second value are measured in the state where the measuring unit 600 is cleaned, a foreign matter adhering to the measuring unit 600 is restrained from affecting the first value and the second value that are measured. Thus, the probability of being able to more accurately measure the first value and the second value increases and the probability of being able to model the three-dimensional modeled object with high accuracy increases further.

In the fourth embodiment, the control unit 500 causes the second cleaning unit 120 to clean the measuring unit 600 before the inspection processing. Therefore, the accuracy of the measuring unit 600 can be inspected more accurately. In another embodiment, the cleaning of the measuring unit 600 may be executed before the measurement of the first value and the measurement of the second value. For example, the cleaning of the measuring unit 600 may be executed after the position adjustment processing or the inspection processing. The cleaning of the distal end surface 63 by the first cleaning unit 110 may be executed before the measurement of the second value. For example, the cleaning of the distal end surface 63 may be executed after the position adjustment processing or the inspection processing or may be executed after the measurement of the first value. The cleaning of the distal end surface 63 may also be executed before the cleaning of the measuring unit 600.

E. Other Embodiments (E-1) In the foregoing embodiments, in step S132 of the measurement process shown in FIG. 11, the control unit 500 may correct the value detected by the measuring unit 600, for example, in such a way as to regard that the distance between the measuring unit 600 and the reference surface 611 when the contact maker 602 is located at the same position as the reference surface 611 in the Z-direction is 0, based on the first value. For example, when the distance measured in step S132 is a distance A, the control unit 500 may correct the value detected by the measuring unit 600 in such a way that the value after the correction is equal to the detected value before the correction minus a value equivalent to the distance A. In this case, in step S136, the control unit 500 moves the nozzle 61 in the −Z-direction to push the contact maker 602 down in the −Z-direction until the second value becomes 0, and thus can acquire the reference Z-coordinate in step S137. Even in this case, the control unit 500 can decide the distance between the distal end surface 63 and the deposition surface 311, based on the reference Z-coordinate acquired based on the first value and the second value, in the three-dimensional modeling processing shown in FIG. 13.

(E-2) In the foregoing embodiments, for example, after the completion of the measurement processing, the control unit 500 may correct the value of the Z-coordinate of the nozzle 61, based on the value of the reference Z-coordinate acquired in step S137 in FIG. 11, before starting the three-dimensional modeling processing. In this case, the control unit 500 corrects the value of the Z-coordinate, for example, in such a way that the value of the Z-coordinate after the correction is equal to the value of the Z-coordinate before the correction plus the value of the reference Z-coordinate acquired in step S137. Even in this case, the control unit 500 can decide the distance between the distal end surface 63 and the deposition surface 311, based on the reference Z-coordinate acquired based on the first value and the second value, in the three-dimensional modeling processing shown in FIG.

13. The control unit 500 may also change, for example, the value of the Z-coordinate of the nozzle 61 or the distance moved by the nozzle 61 designated by modeling data, based on the reference Z-coordinate, and thus may model the three-dimensional modeled object according to the modeling data in which the value of the Z-coordinate or the distance moved is changed, in the three-dimensional modeling processing.

(E-3) In the foregoing embodiments, the control unit 500 controls the measuring unit 600 to measure the distance between the measuring unit 600 and the reference surface 611 as the first value. However, the control unit 500 may not measure the distance between the measuring unit 600 and the reference surface 611 as the first value. The control unit 500 may measure, for example, the amount of movement of the contact maker 602 from the position in the Z-direction of the contact maker 602 to the position in the Z-direction of the reference surface 611, as the first value. The control unit 500 may also measure an ideal amount of movement of the contact maker 602 acquired when the contact maker 602 is moved upward by a predetermined distance, minus the actually measured amount of movement of the contact maker 602, as the first value. Similarly, the control unit 500 may not measure the distance between the measuring unit 600 and the distal end surface 63 as the second value.

(E-4) In the foregoing embodiments, the control unit 500 decides the distance between the distal end surface 63 and the deposition surface 311 for when modeling the three-dimensional modeled object, based on the reference Z-coordinate. However, the control unit 500 may not decide the distance between the distal end surface 63 and the deposition surface 311, based on the reference Z-coordinate. For example, the control unit 500 may calculate the difference between the distance between the distal end surface 63 and the reference surface 611 measured based on the first value and the second value, and the value of the Z-coordinate of the nozzle 61, and may decide the distance between the distal end surface 63 and the deposition surface 311 for when modeling the three-dimensional modeled object, based on the calculated difference. In this case, for example, the control unit 500 first measures the distance between the measuring unit 600 and the reference surface 611 as the first value, measures the distance between the measuring unit 600 and the distal end surface 63 as the second value, and measures the distance between the distal end surface 63 and the reference surface 611, based on the difference between the first value and the second value. Next, the control unit 500 calculates the difference between the distance between the distal end surface 63 and the reference surface 611 and the value of the Z-coordinate of the nozzle 61 at the position where the second value is measured. In the three-dimensional modeling processing, the control unit 500 can decide the distance between the distal end surface 63 and the deposition surface 311, based on this difference. In this case, the first value may be measured before the second value, or the second value may be measured before the first value.

(E-5) In the foregoing embodiments, the three-dimensional modeling device 100 has the heating unit 700. However, the three-dimensional modeling device 100 may not have the heating unit 700.

(E-6) In the foregoing embodiments, the position in the Z-direction of the reference surface 611 coincides with the position in the Z-direction of the deposition surface 311. However, the position in the Z-direction of the reference surface 611 may not coincide with the position in the Z-direction of the deposition surface 311 and may be a position corresponding to the position in the Z-direction of the deposition surface 311. In this case, the position in the Z-direction of the reference surface 611 is adjusted to a position spaced apart by a predetermined distance from the position in the Z-direction of the deposition surface 311, for example, using a block gauge.

(E-7) In the foregoing embodiments, the three-dimensional modeling device 100 has the adjustment unit 620. However, the three-dimensional modeling device 100 may not have the adjustment unit 620. The control unit 500 may not execute the position adjustment processing before measuring the first value and the second value. In this case, for example, the reference surface 611 and the deposition surface 311 may be manually brought into contact with each other directly or indirectly, so as to adjust the position in the Z-direction of the reference surface 611.

(E-8) In the foregoing embodiments, the measuring unit 600 is formed by a contact-type displacement sensor. However, the measuring unit 600 may be formed, for example, by a contactless sensor. For example, the measuring unit 600 may be formed by a laser distance measurement sensor and thus may measure the distance between the measuring unit 600 and a measurement target or the position of the measurement target in relation to the position of the measuring unit 600, based on a change in the image forming position of laser reflection light generated by a change in the distance between the measuring unit 600 and the measurement target. The measuring unit 600 may have both a contact-type displacement sensor and a contactless sensor, for example. The contact-type displacement sensor may measure one of the first value and the second value. The contactless sensor may measure the other.

(E-9) In the foregoing embodiments, the reporting unit 800 is formed by a liquid crystal monitor displaying visual information. However, the reporting unit 800 may not be formed by a liquid crystal monitor. The reporting unit 800 may be formed, for example, by a speaker reporting audio information. The reporting unit 800 may also be formed by a communication device transmitting a message to another computer or the like and thus reporting information. Also, the reporting unit 800 may be configured to report information, using a plurality of reporting measures as described above.

(E-10) In the foregoing embodiments, when the accuracy of the measuring unit 600 does not satisfy the predetermined condition, the control unit 500 controls the reporting unit 800 to report information about the accuracy of the measuring unit 600. However, the control unit 500 may not control the reporting unit 800 to report information about the accuracy of the measuring unit 600. In this case, the three-dimensional modeling device 100 may not have the reporting unit 800.

(E-11) In the foregoing embodiments, the reference unit 610 has the inspection surface 612. However, the reference unit 610 may not have the inspection surface 612. The control unit 500 may not inspect the accuracy of the measuring unit 600.

(E-12) In the foregoing embodiments, the three-dimensional modeling device 100 may have a plurality of nozzles 61 and may have, for example, one or two or more modeling units 200 each having a plurality of nozzles 61 or a plurality of modeling units 200 each having one nozzle 61. In this case, in one session of the measurement processing, the control unit 500 may measure the second value for all the nozzles 61 or may measure the second value for a part of the nozzles 61. For example, the control unit 500 may measure the second value only for the nozzle 61 that is replaced or for the nozzle 61 replaced due to the replacement of the modeling unit 200. The control unit 500 may read modeling data before the measurement processing and measure the second value only for the nozzle 61 actually used in the three-dimensional modeling processing executed after the measurement processing.

(E-13) In the foregoing embodiments, the modeling unit 200 plasticizes the material by the flat screw and thus generates the modeling material. However, the modeling unit 200 may rotate, for example, an in-line screw to plasticize the material and thus generate the modeling material. The modeling unit 200 may also be formed as a head plasticizing and ejecting a filament-like material.

F. Other Aspects

The present disclosure is not limited to the foregoing embodiments and can be implemented according to various aspects without departing from the spirit and scope of the present disclosure. For example, the present disclosure can be implemented according to the aspects described below. A technical feature in the embodiments corresponding to a technical feature in the aspects described below can be suitably replaced or combined in order to solve a part or all of the problems of the present disclosure or in order to achieve a part or all of the effects of the present disclosure. The technical feature can be suitably deleted unless described as essential in the present specification.

(1) According to a first aspect of the present disclosure, a three-dimensional modeling device is provided. The three-dimensional modeling device includes: a modeling unit having a nozzle ejecting a modeling material from a nozzle opening formed at a distal end surface; a stage having a deposition surface where the modeling material is deposited; a movement mechanism unit changing a relative position between the nozzle and the stage; a measuring unit arranged at a position where the measuring unit can face the distal end surface; a reference unit having a reference surface arranged at a position that corresponds to the deposition surface in an intersecting direction intersecting the deposition surface and where the reference surface can face the measuring unit, the reference unit being separate from the nozzle; and a control unit controlling the modeling unit and the movement mechanism unit to model a three-dimensional modeled object. The control unit controls the measuring unit to measure a first value that is a value about a distance between the measuring unit and the reference surface and a second value that is a value about a distance between the measuring unit and the distal end surface, and decides a distance between the distal end surface and the deposition surface for when modeling the three-dimensional modeled object, based on the first value and the second value.

According to such an aspect, the replacement or reattachment of the measuring unit due to the replacement of the modeling unit is restrained. Also, since the distance between the distal end surface and the deposition surface is decided based on the first value and the second value, which are actual measured values, to model the three-dimensional modeled object, the probability of being able to model the three-dimensional modeled object with high accuracy increases.

(2) In the above aspect, the three-dimensional modeling device may have a heating unit moving with the movement of the nozzle and configured to heat the modeling material deposited on the deposition surface. The distal end surface may be located between the heating unit and the deposition surface in the intersecting direction. According to such an aspect, as the heating unit heats the modeling material deposited on the deposition surface, the adhesiveness between the modeling materials can be increased and the strength of the three-dimensional modeled object can be increased. Also, the probability that the three-dimensional modeled object during or after the modeling and the heating unit come into contact with each other is lower than in the case where the heating unit is located between the distal end surface and the deposition surface in the intersecting direction, for example. Therefore, the probability of being able to model the three-dimensional modeled object with high accuracy increases.

(3) In the above aspect, the three-dimensional modeling device may have an adjustment unit changing the position in the intersecting direction of the reference unit. The control unit may control the heating unit to start heating the stage and subsequently control the adjustment unit to bring the reference surface and the deposition surface into contact with each other directly or indirectly so as to cause the position in the intersecting direction of the reference surface and the position in the intersecting direction of the deposition surface to coincide with each other before measuring the first value and the second value. According to such an aspect, the first value and the second value are measured in the state where the position in the intersecting direction of the reference surface is coincident with the position in the intersecting direction of the deposition surface of the heated stage. Therefore, in the configuration where the modeling material deposited on the deposition surface is heated by the heating unit to model the three-dimensional modeled object, the probability of being able to model the three-dimensional modeled object with higher accuracy increases.

(4) In the above aspect, the modeling unit may have an attachment/detachment part configured to be able to attach and detach the nozzle. After the nozzle is attached to the attachment/detachment part, the control unit may measure the first value and the second value before starting the modeling of a three-dimensional modeled object. According to such an aspect, the second value measured by the measuring unit reflects a change in the position in the intersecting direction of the nozzle due to attachment/detachment. Therefore, even in the configuration where the nozzle is configured to be attachable/detachable, the probability of being able to model the three-dimensional modeled object with high accuracy increases.

(5) In the above aspect, the three-dimensional modeling device may have a first cleaning unit cleaning the distal end surface. The control unit may cause the first cleaning unit to clean the distal end surface before measuring the second value. According to such an aspect, since the second value is measured in the state where the distal end surface is cleaned, a foreign matter adhering to the distal end surface is restrained from affecting the measured second value. Thus, the probability of being able to more accurately measure the second value increases and the probability of being able to model the three-dimensional modeled object with high accuracy increases further.

(6) In the above aspect, the three-dimensional modeling device may have a second cleaning unit cleaning the measuring unit. The control unit may cause the second cleaning unit to clean the measuring unit before measuring the first value and the second value. According to such an aspect, since the first value and the second value are measured in the state where the measuring unit is cleaned, a foreign matter adhering to the measuring unit is restrained from affecting the first value and the second value that are measured. Thus, the probability of being able to more accurately measure the first value and the second value increases and the probability of being able to model the three-dimensional modeled object with high accuracy increases further.

(7) In the above aspect, the control unit may bring the measuring unit and the reference surface into contact with each other and thus measure the first value. According to such an aspect, the first value can be accurately measured by simple control.

(8) In the above aspect, the control unit may bring the measuring unit and the distal end surface into contact with each other and thus measure the second value. According to such an aspect, the second value can be accurately measured by simple control.

(9) In the above aspect, the reference unit may have an inspection surface arranged at a position that is spaced apart from the reference surface by a predetermined distance in the intersecting direction and where the inspection surface can face the measuring unit. The control unit may control the measuring unit to measure a height difference between the reference surface and the inspection surface and inspect the accuracy of the measuring unit, based on the height difference that is measured. According to such an aspect, the accuracy of the measuring unit can be inspected easily.

(10) In the above aspect, the three-dimensional modeling device may have a reporting unit. When the accuracy of the measuring unit does not satisfy a predetermined condition, the control unit may control the reporting unit to report information about the accuracy of the measuring unit. According to such an aspect, the user can execute, for example, replacement or maintenance of the measuring unit, based on the information reported by the reporting unit. Therefore, the reliability of the first value and the second value measured by the measuring unit can be increased.

(11) In the above aspect, the movement mechanism unit may move the nozzle in the intersecting direction in relation to the stage, move the stage in a direction along the deposition surface in relation to the nozzle, and thus change the relative position between the nozzle and the stage. According to such an aspect, since the stage need not be moved in the intersecting direction in relation to the nozzle, the reference surface can be more easily located at a position corresponding to the deposition surface in the intersecting direction than when, for example, the stage is moved in the intersecting direction in relation to the nozzle. Therefore, the first value can be measured by a simple configuration.

(12) According to a second aspect of the present disclosure, a method for manufacturing a three-dimensional modeled object in a three-dimensional modeling device is provided. The three-dimensional modeling device includes: a nozzle ejecting a modeling material from a nozzle opening formed at a distal end surface; a stage having a deposition surface where the modeling material is deposited; a movement mechanism unit changing a relative position between the nozzle and the stage; a measuring unit arranged at a position where the measuring unit can face the distal end surface; and a reference unit having a reference surface arranged at a position that corresponds to the deposition surface in an intersecting direction intersecting the deposition surface and where the reference surface can face the measuring unit, the reference unit being separate from the nozzle. The method for manufacturing the three-dimensional modeled object includes: a first process of causing the measuring unit to measure a first value that is a value about a distance between the measuring unit and the reference surface; a second process of causing the measuring unit to measure a second value that is a value about a distance between the measuring unit and the distal end surface; and a third process of changing the relative position between the nozzle ejecting the modeling material and the stage and thus modeling the three-dimensional modeled object. A distance between the distal end surface and the deposition surface in the third process is decided, based on the first value and the second value.

According to such an aspect, the replacement or reattachment of the measuring unit due to the replacement of the modeling unit is restrained. Also, since the distance between the distal end surface and the deposition surface is decided based on the first value and the second value, which are actual measured values, to model the three-dimensional modeled object, the probability of being able to model the three-dimensional modeled object with high accuracy increases.

What is claimed is:

1. A three-dimensional modeling device comprising:
    a modeling unit having a nozzle ejecting a modeling material from a nozzle opening formed at a distal end surface;
    a stage having a deposition surface where the modeling material is deposited;
    a movement mechanism unit configured to change a relative position between the nozzle and the stage and configured to position a measuring unit to selectively face the distal end surface, the movement mechanism having an actuator and the measuring unit having a sensor;
    a reference unit having a reference surface arranged at a position that corresponds to the deposition surface in an intersecting direction intersecting the deposition surface, the reference unit being separate from the nozzle; and
    a control unit configured to control the modeling unit and the movement mechanism unit to model a three-dimensional modeled object,
    the control unit
        configured to control the movement mechanism to position the measuring unit to face the reference surface for the measuring unit to measure a first value that is a value about a distance between the measuring unit and the reference surface and control the movement mechanism unit to position the measuring unit to face the distal end surface for the measuring unit to measure a second value that is a value about a distance between the measuring unit and the distal end surface, and
        configured to decide a distance between the distal end surface and the deposition surface for when modeling the three-dimensional modeled object, based on the first value and the second value.

2. The three-dimensional modeling device according to claim 1, further comprising:
    a heating unit configured to move with the movement of the nozzle and configured to heat the modeling material deposited on the deposition surface, wherein
    the distal end surface is located between the heating unit and the deposition surface in the intersecting direction.

3. The three-dimensional modeling device according to claim 2, wherein
    the control unit is configured to control the heating unit to start heating the stage and subsequently control an adjustment unit to bring the reference surface and the deposition surface into contact with each other directly or indirectly so as to cause the position in the intersecting direction of the reference surface and the position in the intersecting direction of the deposition surface to coincide with each other before measuring the first value and the second value, the adjustment unit having an actuator.

4. The three-dimensional modeling device according to claim 1, wherein
the modeling unit has an attachment/detachment part configured to be able to attach and detach the nozzle, and
after the nozzle is attached to the attachment/detachment part, the control unit is configured to measure the first value and the second value before starting the modeling of the three-dimensional modeled object.

5. The three-dimensional modeling device according to claim 1, further comprising:
a first cleaning unit configure to clean the distal end surface, the first cleaning unit having a first member in contact with the distal end, wherein
the control unit is configured to control the movement mechanism unit to move the first cleaning unit to clean the distal end surface before measuring the second value.

6. The three-dimensional modeling device according to claim 1, further comprising:
a second cleaning unit configured to clean the measuring unit, the second cleaning unit having a second member in contact with the measuring unit, wherein
the control unit is configured to control the movement mechanisms unit to move the second cleaning unit to clean the measuring unit before measuring the first value and the second value.

7. The three-dimensional modeling device according to claim 1, wherein
the control unit is configured to control an adjustment unit to bring the measuring unit and the reference surface into contact with each other and measure the first value, the adjustment unit having an actuator.

8. The three-dimensional modeling device according to claim 1, wherein
the control unit is configured to control the movement mechanism unit to bring the measuring unit and the distal end surface into contact with each other and measure the second value.

9. The three-dimensional modeling device according to claim 1, wherein
the reference unit has an inspection surface arranged at a position that is spaced apart from the reference surface by a predetermined distance in the intersecting direction and where the inspection surface can face the measuring unit, and
the control unit is configured to control the measuring unit to measure a height difference between the reference surface and the inspection surface and inspect accuracy of the measuring unit, based on the height difference that is measured.

10. The three-dimensional modeling device according to claim 9, further comprising:
a reporting unit, wherein
when the accuracy of the measuring unit does not satisfy a predetermined condition, the control unit is configured to control the reporting unit to report information about the accuracy of the measuring unit.

11. The three-dimensional modeling device according to claim 1, wherein
the movement mechanism unit is configured to move the nozzle in the intersecting direction in relation to the stage, move the stage in a direction along the deposition surface in relation to the nozzle, and change the relative position between the nozzle and the stage.

12. The three-dimensional modeling device according to claim 1, wherein the adjustment unit is configured to change the position in the intersecting direction of the reference unit to selectively face a measuring unit.

* * * * *